United States Patent
Tsubone

(10) Patent No.: US 12,457,249 B2
(45) Date of Patent: Oct. 28, 2025

(54) STORAGE MEDIUM TO STORE TRANSMISSION DATA SETTING SUPPORT PROGRAM, GATEWAY DEVICE, AND TRANSMISSION DATA SETTING SUPPORTING METHOD

(71) Applicant: Mitsubishi Electric Corporation, Tokyo (JP)

(72) Inventor: Akira Tsubone, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 491 days.

(21) Appl. No.: 17/915,521

(22) PCT Filed: Dec. 28, 2020

(86) PCT No.: PCT/JP2020/049183
§ 371 (c)(1),
(2) Date: Sep. 29, 2022

(87) PCT Pub. No.: WO2022/144996
PCT Pub. Date: Jul. 7, 2022

(65) Prior Publication Data
US 2023/0124678 A1    Apr. 20, 2023

(51) Int. Cl.
*H04L 65/102* (2022.01)
*G06N 3/08* (2023.01)

(52) U.S. Cl.
CPC .......... *H04L 65/102* (2013.01); *G06N 3/08* (2013.01)

(58) Field of Classification Search
CPC ..... H04L 65/102; H04L 67/565; H04L 67/12; G06N 3/08; H04M 11/00; H04Q 9/00
See application file for complete search history.

(56) References Cited

U.S. PATENT DOCUMENTS 5,565,895 A * 10/1996 Akatsuka ............... G05B 19/05
                                                        358/1.16
5,699,310 A * 12/1997 Garloff .................... G06F 8/33
                                                        717/108

(Continued)

FOREIGN PATENT DOCUMENTS

JP    2019-102974 A    6/2019

OTHER PUBLICATIONS

International Search Report and Written Opinion mailed on Feb. 16, 2021, received for PCT Application PCT/JP2020/049183, filed on Dec. 28, 2020, 8 pages including English Translation.

*Primary Examiner* — Khaled M Kassim
*Assistant Examiner* — Christopher A. Reyes
(74) *Attorney, Agent, or Firm* — XSENSUS LLP

(57) ABSTRACT

A transmission data setting support program causes a computer to execute a first rule reading step, a transmission data extracting step, a data adding step, and a displaying step. The first rule reading step reads a transmission data extraction rule that is a rule defining a condition for extracting, from collected data, transmission data, using attribute information indicating characteristics of data. The transmission data is data to be transmitted to an external device. The collected data is data collected from devices. The transmission data extracting step extracts data satisfying the transmission data extraction rule, as transmission data, from data collection setting information including setting of the computer for collecting collected data from the devices. The data adding step adds the extracted data to data transmission setting information including a condition for transmission of the transmission data to the external device.

10 Claims, 14 Drawing Sheets

(56) References Cited

U.S. PATENT DOCUMENTS

| | | | |
|---|---|---|---|
| 10,382,294 B2* | 8/2019 | Bali | H04L 67/12 |
| 10,917,263 B1* | 2/2021 | Sheehan | H04L 41/022 |
| 11,221,601 B1* | 1/2022 | Chakraborty | G06F 3/0481 |
| 11,316,908 B1* | 4/2022 | Chakraborty | G06Q 50/12 |
| 2003/0149667 A1* | 8/2003 | Onishi | G06F 21/10 |
| | | | 705/52 |
| 2006/0067209 A1* | 3/2006 | Sheehan | H04L 12/66 |
| | | | 370/216 |
| 2010/0145865 A1* | 6/2010 | Berger | G06Q 10/08 |
| | | | 340/572.1 |
| 2013/0054644 A1* | 2/2013 | Nakano | G06F 40/10 |
| | | | 707/774 |
| 2017/0006135 A1* | 1/2017 | Siebel | G06F 8/24 |
| 2017/0146969 A1* | 5/2017 | Yamada | G08C 17/02 |
| 2017/0149900 A1* | 5/2017 | Moriguchi | G05B 23/0221 |
| 2017/0228750 A1* | 8/2017 | Hirota | G06Q 30/0206 |
| 2017/0352260 A1* | 12/2017 | Saito | H04L 12/40169 |
| 2018/0262533 A1* | 9/2018 | McCaig | H04L 63/1441 |
| 2018/0309818 A1* | 10/2018 | Park | H04L 41/0853 |
| 2019/0209022 A1* | 7/2019 | Sobol | A61B 5/1112 |
| 2019/0286807 A1* | 9/2019 | Sugaya | G06F 21/32 |
| 2020/0034264 A1* | 1/2020 | Hidaka | G06F 11/3058 |
| 2020/0059756 A1* | 2/2020 | Misumi | H04L 67/12 |
| 2020/0145880 A1* | 5/2020 | Kubo | H04W 84/18 |
| 2020/0166388 A1* | 5/2020 | Naito | G01D 3/022 |
| 2020/0167148 A1* | 5/2020 | Park | G06F 8/71 |
| 2020/0225655 A1* | 7/2020 | Cella | G05B 23/0221 |
| 2020/0279381 A1* | 9/2020 | Uesugi | H04N 21/4622 |
| 2020/0348662 A1* | 11/2020 | Cella | G05B 19/41865 |
| 2020/0351348 A1* | 11/2020 | Naito | H04Q 9/00 |
| 2021/0014314 A1* | 1/2021 | Yamada | H04L 67/12 |
| 2021/0056050 A1* | 2/2021 | Yamato | H04Q 9/00 |
| 2021/0075858 A1* | 3/2021 | Naito | H04L 67/12 |
| 2021/0157312 A1* | 5/2021 | Cella | G01M 13/045 |
| 2021/0360070 A1* | 11/2021 | Cella | H04L 67/565 |
| 2022/0095079 A1* | 3/2022 | Volkerink | H04W 4/80 |
| 2022/0108262 A1* | 4/2022 | Cella | G05B 17/02 |
| 2022/0230193 A1* | 7/2022 | Miyahara | G06Q 10/04 |

\* cited by examiner

FIG.2

| NUM-BER | DATA NAME | CONNECTED DEVICE | AD-DRESS | DATA TYPE | COLLECTION CYCLE | COMMENT |
|---|---|---|---|---|---|---|
| 1 | PRODUCTION VOLUME A | PLC A | D0 | int | 1sec | FACILITY A PRODUCTION VOLUME |
| 2 | TARGET PRODUCTION VOLUME A | PLC A | D1 | int | 1sec | FACILITY A TARGET PRODUCTION VOLUME |
| 3 | STOP SIGNAL A | PLC A | M1 | bool | 1sec | FACILITY A STOP SIGNAL |
| 4 | CYCLE TIME A | PLC A | D2 | float | 10sec | FACILITY A CYCLE TIME |
| 5 | OPERATION RATE A | - | - | float | 60min | FACILITY A OPERATION RATE |
| 6 | PRODUCTION VOLUME B | PLC B | D10 | int | 1sec | FACILITY B PRODUCTION VOLUME |
| 7 | TARGET PRODUCTION VOLUME B | PLC B | D11 | int | 1sec | FACILITY B TARGET PRODUCTION VOLUME |
| 8 | STOP SIGNAL B | PLC B | M11 | bool | 1sec | FACILITY B STOP SIGNAL |
| 9 | CYCLE TIME B | PLC B | D12 | float | 10sec | FACILITY B CYCLE TIME |
| 10 | OPERATION RATE B | - | - | float | 60min | FACILITY B OPERATION RATE |
| ... | ... | ... | ... | ... | ... | ... |

FIG.3

| NUMBER | CONTENT |
|---|---|
| 1 | "PRODUCTION VOLUME" IS INCLUDED AS DATA NAME IN DATA COLLECTION SETTING INFORMATION |
| 2 | "FACILITY A" IS INCLUDED AS COMMENT IN DATA COLLECTION SETTING INFORMATION |
| 3 | COLLECTION CYCLE OF DATA COLLECTION SETTING INFORMATION IS 60 min OR LONGER |
| ... | ... |

FIG.4

| NUMBER | DATA NAME | TRANS-MISSION CYCLE | COMMENT | TRANSMISSION DESTINATION |
|---|---|---|---|---|
| 1 | PRODUCTION VOLUME A | | FACILITY A PRODUCTION VOLUME | |
| 2 | TARGET PRODUCTION VOLUME A | | FACILITY A TARGET PRODUCTION VOLUME | |
| 3 | PRODUCTION VOLUME B | | FACILITY B PRODUCTION VOLUME | |
| 4 | TARGET PRODUCTION VOLUME B | | FACILITY B TARGET PRODUCTION VOLUME | |
| 5 | STOP SIGNAL A | | FACILITY A STOP SIGNAL | |
| 6 | CYCLE TIME A | | FACILITY A CYCLE TIME | |
| 7 | OPERATION RATE A | | FACILITY A OPERATION RATE | |
| 8 | OPERATION RATE B | | FACILITY B OPERATION RATE | |
| ... | ... | ... | ... | ... |

FIG.5

| NUMBER | DATA NAME | TRANS-MISSION CYCLE | COMMENT | TRANSMISSION DESTINATION |
|---|---|---|---|---|
| 1 | PRODUCTION VOLUME A | 30sec | FACILITY A PRODUCTION VOLUME | URL OF SERVER A |
| 2 | TARGET PRODUCTION VOLUME A | 30sec | FACILITY A TARGET PRODUCTION VOLUME | URL OF SERVER A |
| 3 | PRODUCTION VOLUME B | 30sec | FACILITY B PRODUCTION VOLUME | URL OF SERVER A |
| 4 | TARGET PRODUCTION VOLUME B | 30sec | FACILITY B TARGET PRODUCTION VOLUME | URL OF SERVER A |
| 5 | STOP SIGNAL A | 30sec | FACILITY A STOP SIGNAL | URL OF SERVER A |
| 6 | CYCLE TIME A | 30sec | FACILITY A CYCLE TIME | URL OF SERVER A |
| 7 | OPERATION RATE A | 30sec | FACILITY A OPERATION RATE | URL OF SERVER A |
| 8 | OPERATION RATE B | 30sec | FACILITY B OPERATION RATE | URL OF SERVER A |
| ... | ... | ... | ... | ... |

| NUM-BER | DATA NAME | ADDRESS | DATA TYPE | COMMENT | REFERENCE |
|---|---|---|---|---|---|
| 1 | PRODUCTION VOLUME A | D0 | int | FACILITY A PRODUCTION VOLUME | FACILITY A MONITORING PROGRAM |
| 2 | TARGET PRODUCTION VOLUME A | D0 | int | FACILITY A TARGET PRODUCTION VOLUME | FACILITY A MONITORING PROGRAM |
| 3 | STOP SIGNAL A | M1 | bool | FACILITY A STOP SIGNAL | FACILITY A MONITORING PROGRAM |
| 4 | STOP SIGNAL A | M1 | bool | FACILITY A STOP SIGNAL | ERROR PROCESSING PROGRAM |
| 5 | CYCLE TIME A | D2 | float | FACILITY A CYCLE TIME | FACILITY A MONITORING PROGRAM |
| 6 | CYCLE TIME A | D2 | float | FACILITY A CYCLE TIME | CYCLE TIME CALCULATION PROGRAM |
| ... | ... | ... | ... | ... | ... |

| NUMBER | CONTENT |
|---|---|
| 1 | "PRODUCTION VOLUME" IS INCLUDED AS DATA NAME IN DATA COLLECTION SETTING INFORMATION |
| 2 | "FACILITY A" IS INCLUDED AS COMMENT IN DATA COLLECTION SETTING INFORMATION |
| 3 | COLLECTION CYCLE OF DATA COLLECTION SETTING INFORMATION IS 60 min OR LONGER |
| 4 | DATA USED IN "FACILITY A MONITORING PROGRAM" |
| ... | ... |

FIG.9

| NUM-BER | DATA NAME | CONNECTED DEVICE | AD-DRESS | DATA TYPE | COLLECTION CYCLE | RETEN-TION PERIOD | COMMENT |
|---|---|---|---|---|---|---|---|
| 1 | PRO-DUCTION VOLUME A | PLC A | D0 | int | 1sec | 7 DAYS | FACILITY A PRODUCTION VOLUME |
| 2 | PRO-DUCTION VOLUME B | PLC B | D10 | int | 1sec | 30 DAYS | FACILITY B PRODUCTION VOLUME |
| ... | ... | ... | ... | ... | ... | | ... |

FIG.10

| NUMBER | CONTENT |
|---|---|
| 1 | DATA WITH RETENTION PERIOD OF 30 DAYS OR LONGER |
| ... | ... |

FIG.18

| NUMBER | CONTENT |
|---|---|
| 1 | DIVIDE DATA WITH DATA NAME ("PRODUCTION VOLUME" + SYMBOL) BY ("TARGET PRODUCTION VOLUME" + SYMBOL), AND SET RESULT AS DATA NAME ("PROGRESSION RATE" + SYMBOL) |
| ... | ... |

| NUMBER | CONTENT OF COMPUTATION | COMPUTATION RESULT |
|---|---|---|
| 1 | PRODUCTION VOLUME A/ TARGET PRODUCTION VOLUME A | PROGRESSION RATE A |
| 2 | PRODUCTION VOLUME B/ TARGET PRODUCTION VOLUME B | PROGRESSION RATE B |
| ... | ... | ... |

| NUM-BER | DATA NAME | CONNECTED DEVICE | ADDRESS | DATA TYPE | COLLEC-TION CYCLE | COMMENT |
|---|---|---|---|---|---|---|
| 1 | PRODUCTION VOLUME A | PLC A | D0 | int | 1sec | FACILITY A PRODUCTION VOLUME |
| 2 | TARGET PRODUCTION VOLUME A | PLC A | D1 | int | 1sec | FACILITY A PRODUCTION VOLUME |
| 3 | STOP SIGNAL A | PLC A | M1 | bool | 1sec | FACILITY A STOP SIGNAL |
| 4 | CYCLE TIME A | PLC A | D2 | float | 10sec | FACILITY A CYCLE TIME |
| 5 | OPERATION RATE A | - | - | float | 60min | FACILITY A OPERATION RATE |
| 6 | PRODUCTION VOLUME B | PLC B | D10 | int | 1sec | FACILITY B PRODUCTION VOLUME |
| 7 | TARGET PRODUCTION VOLUME B | PLC B | D11 | int | 1sec | FACILITY B PRODUCTION VOLUME |
| 8 | STOP SIGNAL B | PLC B | M11 | bool | 1sec | FACILITY B STOP SIGNAL |
| 9 | CYCLE TIME B | PLC B | D12 | float | 10sec | FACILITY B CYCLE TIME |
| 10 | OPERATION RATE B | - | - | float | 60min | FACILITY B OPERATION RATE |
| 11 | PROGRESSION RATE A | - | - | float | 1sec | FACILITY A PROGRESSION RATE |
| 12 | PROGRESSION RATE B | - | - | float | 1sec | FACILITY B PROGRESSION RATE |
| ... | ... | ... | ... | ... | ... | ... |

FIG.21

| NUMBER | DATA NAME | TRANS-MISSION CYCLE | COMMENT | TRANSMISSION DESTINATION |
|---|---|---|---|---|
| 1 | PRODUCTION VOLUME A | 30sec | FACILITY A PRODUCTION VOLUME | URL OF SERVER A |
| 2 | TARGET PRODUCTION VOLUME A | 30sec | FACILITY A TARGET PRODUCTION VOLUME | URL OF SERVER A |
| 3 | PRODUCTION VOLUME B | 30sec | FACILITY B PRODUCTION VOLUME | URL OF SERVER A |
| 4 | TARGET PRODUCTION VOLUME B | 30sec | FACILITY B TARGET PRODUCTION VOLUME | URL OF SERVER A |
| 5 | STOP SIGNAL A | 30sec | FACILITY A STOP SIGNAL | URL OF SERVER A |
| 6 | CYCLE TIME A | 30sec | FACILITY A CYCLE TIME | URL OF SERVER A |
| 7 | OPERATION RATE A | 30sec | FACILITY A OPERATION RATE | URL OF SERVER A |
| 8 | OPERATION RATE B | 30sec | FACILITY B OPERATION RATE | URL OF SERVER A |
| 9 | PROGRESSION RATE A | 30sec | FACILITY A PROGRESSION RATE | URL OF SERVER A |
| 10 | PROGRESSION RATE B | 30sec | FACILITY B PROGRESSION RATE | URL OF SERVER A |
| ... | ... | ... | ... | ... |

STORAGE MEDIUM TO STORE TRANSMISSION DATA SETTING SUPPORT PROGRAM, GATEWAY DEVICE, AND TRANSMISSION DATA SETTING SUPPORTING METHOD

CROSS-REFERENCE TO RELATED APPLICATION

The present application is based on PCT filing PCT/JP2020/049183, filed Dec. 28, 2020, the entire contents of which are incorporated herein by reference.

FIELD

The present disclosure relates to a transmission data setting support program for supporting settings in a gateway device that collects data from devices of a production facility, etc. and transmits data to external devices, a gateway device, and a transmission data setting supporting method.

BACKGROUND

A variety of devices such as programmable logic controllers (PLCs), sensors, inverters, and robots exist at sites such as manufacturing lines in factories, individual equipment, plants, and office buildings. In addition, gateway devices that collect data from such devices and transmit certain data to external devices such as a cloud server exist in order to analyze or monitor the statuses of the devices. If a gateway device transmits all of collected data to an external device, the communication traffic increases, which may not satisfy the performance or requirement that is required of a gateway device. To avoid this, processes including data analysis or processing may be performed in a gateway device. This is called edge computing.

In addition, Patent Literature 1 teaches a data collection system capable of efficiently transmitting, to a server, necessary data from among data collected from a plurality of devices. The data collection system described in Patent Literature 1 includes a control device and a gateway device. The control device repeatedly receives data from a plurality of grouped devices, and stores the received data in a memory address area associated with a group to which the transmission source device of the received data belongs. Referring to master information specifying, as a monitored device, a device to be monitored by the server, the gateway device repeatedly requests, from the control device, the batch transmission of data stored in a memory address area associated with a group to which the monitored device belongs. The gateway device also receives data transmitted from the control device in response to requests, extracts data from the monitored device from among the received data, converts the extracted data, and transmits the converted data to the server at a frequency equal to or lower than a requested frequency.

Note that a gateway device processes data in accordance with data transmission setting information that classifies in advance collected data into data to be transmitted to and processed by an external device and data to be processed in the gateway device. Typically, data is classified on the basis of the following criteria. Data required to provide a real time characteristic that allows for collecting data in a short cycle and quickly feeding the result of processing back to a device at a site is processed in the gateway device. In contrast, data in a large amount or desired to be saved for a long period without having to provide the real time characteristic, or data accessible from anywhere is processed by an external device. Conventionally, on the basis of such criteria, a user creates data transmission setting information, manually selecting, on a display screen of a computer system, pieces of data one-by-one in determining which data is to be transmitted to the outside, and the thus created data transmission setting information is set in a gateway device.

CITATION LIST

Patent Literature

Patent Literature 1: Japanese Patent Application Laid-open No. 2019-102974

SUMMARY

Technical Problem

The technology described in Patent Literature 1 can prevent the increase in traffic of data transmission paths and increase the efficiency of data transmitting processing itself, but poses a problem of requiring a user to determine data that should be transmitted to the outside and set such data in the data transmission setting information. When by the gateway device collects a large amount of data, the user bears a great burden.

The present disclosure has been made in view of the above, and an object thereof is to provide a transmission data setting support program capable of supporting, in a gateway device, a user's generation of data transmission setting information for setting data to be transmitted to an external device.

Solution to Problem

To solve the aforementioned problems and achieve the object, a transmission data setting support program according to the present disclosure causes a computer to execute a first rule reading step, a transmission data extracting step, a data adding step, and a displaying step. The first rule reading step reads a transmission data extraction rule, the transmission data extraction rule being a rule defining a condition for extracting transmission data from collected data, using attribute information indicating characteristics of the data, the transmission data being data to be transmitted to an external device, the collected data being data collected from devices. The transmission data extracting step extracts, as the transmission data, data satisfying the transmission data extraction rule, from data collection setting information including setting of the computer when collecting the collected data from the devices. The data adding step adds the extracted data to data transmission setting information including a condition for transmission of the transmission data to the external device. The displaying step displays, on a display unit, the data transmission setting information including the added data.

Advantageous Effects of Invention

A transmission data setting support program according to the present disclosure produces an effect of enabling, in a gateway device, support of a user's generation of data transmission setting information for setting data to be transmitted to an external device.

BRIEF DESCRIPTION OF DRAWINGS

FIG. 2 is a table illustrating an example of managed data information according to the first embodiment.

FIG. 3 is a table illustrating an example of a transmission data extraction rule according to the first embodiment.

FIG. 4 is a table illustrating an example of data transmission setting information according to the first embodiment.

FIG. 5 is a table illustrating an example of data transmission setting information according to the first embodiment.

FIG. 7 is a table illustrating an example of cross-reference information according to the first embodiment.

FIG. 8 is a table illustrating another example of the transmission data extraction rule according to the first embodiment.

FIG. 9 is a table illustrating an example of managed data information according to a second embodiment.

FIG. 10 is a table illustrating an example of a transmission data extraction rule according to the second embodiment.

FIG. 18 is a table illustrating an example of computed data generation rule according to the fourth embodiment.

FIG. 19 is a table illustrating an example of data computation setting information according to the fourth embodiment.

FIG. 20 is a table illustrating an example of managed data information according to the fourth embodiment.

FIG. 21 is a table illustrating an example of data transmission setting information according to the fourth embodiment.

DESCRIPTION OF EMBODIMENTS

A transmission data setting support program, a gateway device, and a transmission data setting supporting method according to certain embodiments of the present disclosure will be described in detail below with reference to the drawings.

First Embodiment

Figure 1:
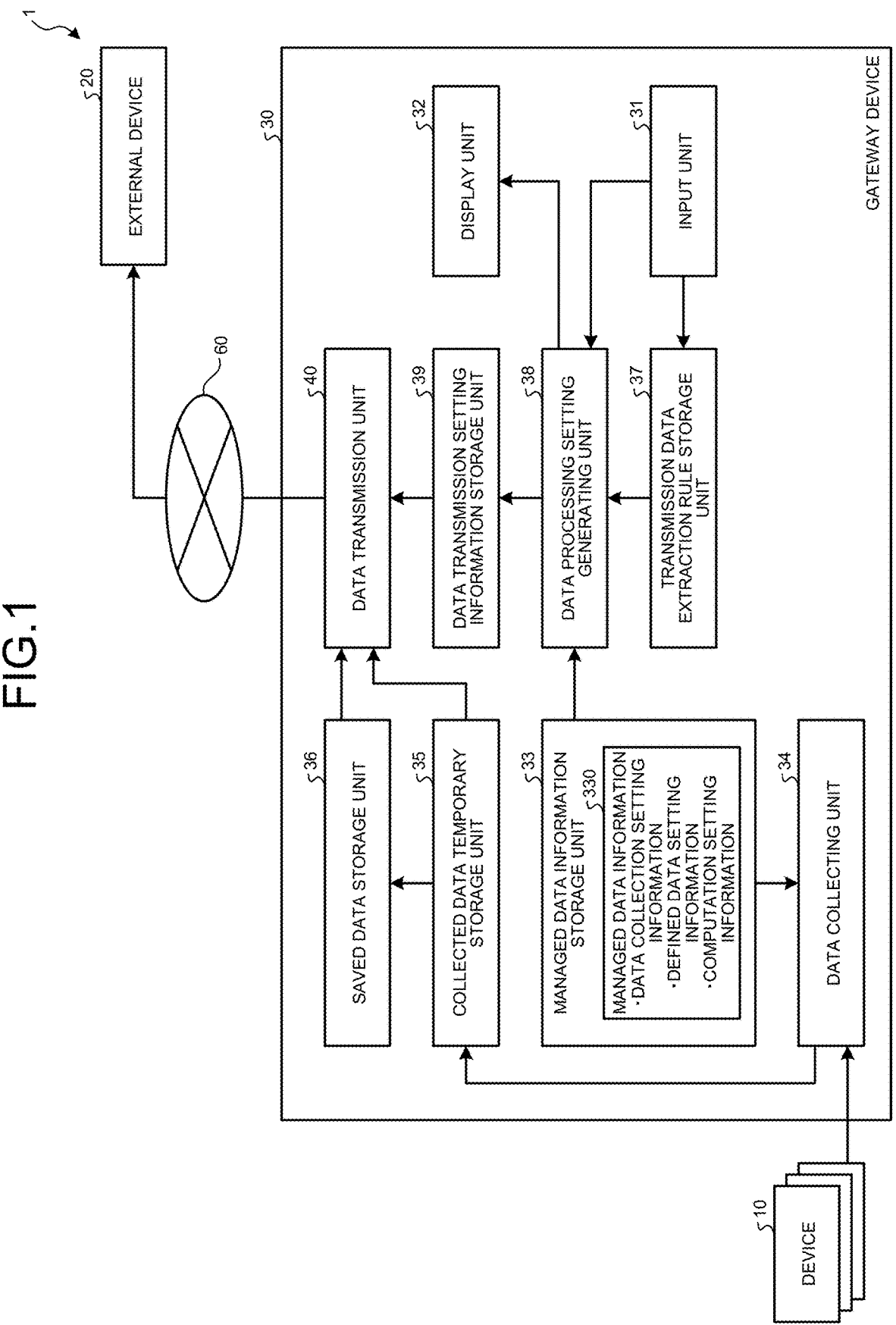
FIG. 1 is a block diagram illustrating an example of a configuration of a data transmission system including a gateway device according to a first embodiment.

FIG. 1 is a block diagram illustrating an example of a configuration of a data transmission system including a gateway device according to a first embodiment. The data transmission system 1 includes devices 10, an external device 20, and a gateway device 30. The devices 10 and the gateway device 30 are connected with each other via various wired or wireless networks or communication lines, and the gateway device 30 and the external device 20 are connected with each other via a network 60 such as the Internet. The network 60 may be a wired or wireless network.

The devices 10 are installed at such sites as manufacturing lines of factories, individual pieces of equipment, plants, and office buildings. Examples of the devices 10 include PLCs, sensors, inverters, and robots.

The external device 20 analyzes or monitors the statuses of the devices 10, using data collected from the devices 10. Examples of the external device 20 include a server, a device that manages the devices 10, an application and a service for managing the devices 10. In a case where the external device 20 is a server, the server may be a cloud server or an on-premises server.

The gateway device 30 is a device that collects data from the devices 10 and transmits, to the external device 20, data among the collected data in accordance with a predetermined setting. The gateway device 30 may also perform computation, using the collected data. The gateway device 30 includes an input unit 31, a display unit 32, a managed data information storage unit 33, a data collecting unit 34, a collected data temporary storage unit 35, a saved data storage unit 36, a transmission data extraction rule storage unit 37, a data processing setting generating unit 38, a data transmission setting information storage unit 39, and a data transmission unit 40.

The input unit 31 receives information which a user inputs. As will be described later, the input unit 31 receives a transmission data extraction rule or content of data transmission setting information, both of which are input by the user.

The display unit 32 displays information generated in the gateway device 30. For example, the display unit 32 displays data transmission setting information generated by the data processing setting generating unit 38, which will be described later.

The managed data information storage unit 33 stores managed data information, which is information on managed data that are data managed by the gateway device 30. The managed data information includes settings of the gateway device 30 when the gateway device 30 collects and manages data. The managed data information, which includes information on data collected from the devices 10, may also include information on data defined or computed in the gateway device 30. Thus, the managed data information includes information regarding data collection setting information, defined data setting information, and computation setting information. The data collection setting information includes setting of the gateway device 30 for collecting collected data. The collected data is data collected from the devices 10. The defined data setting information is set about defined data. The defined data is data defined in the gateway device 30. The computation setting information is set about computation using the collected data and the defined data.

FIG. 2 is a table illustrating an example of the managed data information according to the first embodiment. The managed data information 330 includes records including at least a data name. One record is made up of by a plurality of fields. The name of a field is a field name. In the example of FIG. 2, the field names of the records include a number, a data name, a connected device, an address, a data type, a collection cycle, and a comment. In addition, a record is a set of data including a number, a data name, a connected device, an address, a data type, a collection cycle, and a comment, all of which are the fields.

A number is identification information assigned to a record included in the managed data information 330. A data name is a name assigned to data managed by the gateway device 30. A connected device indicates the device 10 from which data represented by a data name is collected. A device 10 from which to collect data is connected with the gateway device 30 via a network or a communication line. An address indicates a position in a memory of the device 10 from which to collect data, and data represented by a data name is stored at that position. A data type indicates the type of data represented by a data name. Examples of the data type include "int" representing an integer type, "float" representing a real type, and "bool" representing a Boolean algebra type. A collection cycle indicates a cycle in which data represented by a data name is collected. A comment indicates a comment added for data represented by a data name. In one example, the comment reflects a content input by the user.

Note that the managed data information 330 illustrated in FIG. 2 is an example, and the managed data information 330 may include fields other than those described above. In one example, the managed data information 330 may include a field indicating whether or not to save collected data, a field indicating where to save the collected data when the collected data are to be saved, a field indicating a usage rate of a central processing unit (CPU) or a memory in a PLC or the gateway device 30 for data represented by a data name, and the like.

In the example of FIG. 2, the records with the numbers "1" to "4" and "6" to "9" correspond to the data collection setting information. In addition, the records with the numbers "5" and "10" correspond to the defined data setting information or the computation setting information. While the data collection setting information illustrated in FIG. 2 is included in the managed data information 330 together with the defined data setting information or the computation setting information, the data collection setting information may be separate from the defined data setting information or the computation setting information. The managed data information 330 and the data collection setting information each include attribute information indicating data characteristics. The attribute information includes information identifying data to be managed or collected and information indicating how the managed or collected data are to be treated. Examples of the attribute information include a data name, a storage location, a data type, information on how to generate, collect, and update data, and a place and purpose of use of data. In FIG. 2, the attribute information on data is indicated as the field except for the number.

Reference is made back to FIG. 1. The data collecting unit 34 collects data from the devices 10 on the basis of the data collection setting information in the managed data information storage unit 33, and stores the collected data in the collected data temporary storage unit 35. The collected data in the collected data temporary storage unit 35 includes data which the data collection setting information sets as data that should be saved, and the data collecting unit 34 saves such data into the saved data storage unit 36. Note that the data collecting unit 34 may obtain data from the devices 10 via other collection devices such as an object linking and embedding for process control (OPC) server. In this case, the data collection setting information may be in a form referring to the setting of the aforementioned other collection device.

The collected data temporary storage unit 35 temporarily stores collected data collected by the data collecting unit 34.

Among the collected data in the collected data temporary storage unit 35, collected data set in the data collection setting information is stored as files in the saved data storage unit 36.

The transmission data extraction rule storage unit 37 stores a transmission data extraction rule. The transmission data extraction rule defines, through the use of the attribute information indicating the characteristics of data, a condition for extracting transmission data from data collected from the devices 10. The transmission data is data to be transmitted to the external device 20. In one example, the transmission data extraction rule is input by the user via the input unit 31.

FIG. 3 is a table illustrating an example of the transmission data extraction rule according to the first embodiment. Note that, in the example of FIG. 3, for ease of understanding, the rule is expressed in texts. The transmission data extraction rule 370 includes records each including a content indicating a condition for extracting transmission data. One record is made up of a plurality of fields. The name of a field is a field name. In the example of FIG. 3, the field names include a number and a content. A record is a set of data having a number and a content as fields. A number is identification information assigned to a record included in the transmission data extraction rule 370. A content defines a condition for extracting transmission data from among collected data.

A condition defined by a content is expressed using the attribute information associated with data in the data collection setting information or the managed data information 330. Specifically, in one example, a content is expressed using a field name and a field value of the data collection setting information. In other words, a content includes a condition using the attribute information in the data collection setting information and a value of the attribute information. In one example, the attribute information used in a condition is information that is at least one of a data name, a data type, a connected device, an address, and a comment of data in the data collection setting information or the managed data information 330.

Reference is made back to FIG. 1. The data processing setting generating unit 38 extracts, from the data collection setting information, transmission data that is data satisfying the transmission data extraction rule 370. The data processing setting generating unit 38 adds a record including the extracted data to the data transmission setting information including a condition for transmission of transmission data to the external device 20. The data processing setting generating unit 38 displays, on the display unit 32, the data transmission setting information to which the record including the extracted data is added. Specifically, the data processing setting generating unit 38 reads the transmission data extraction rule 370, and extracts, from new records in the data collection setting information, a record corresponding to data satisfying the transmission data extraction rule 370. The data processing setting generating unit 38 adds a record corresponding to the extracted record to the data transmission setting information in the data transmission setting information storage unit 39. The data processing setting generating unit 38 displays, on the display unit 32, the data transmission setting information having the record added, and reflects, in the data transmission setting information, information input by the user to the data transmission setting information.

FIG. 4 is a table illustrating an example of the data transmission setting information according to the first embodiment. The data transmission setting information 390 illustrated in FIG. 4 includes a record including a condition for transmission of transmission data. One record is made up of a plurality of fields. The name of a field is a field name. In the example of FIG. 4, the field names include a number, a data name, a transmission cycle, a comment, and a transmission destination. The record is a set of data including a number, a data name, a transmission cycle, a comment, and a transmission destination, all of which are the fields.

A number is identification information assigned to a record included in the data transmission setting information 390. A data name, which is the data name of collected data extracted as transmission data, is a data name in the data collection setting information included in the managed data information 330 in FIG. 2. A transmission cycle indicates a cycle in which data represented by a data name is transmitted to the external device 20. A comment, which is the comment on data represented by a data name, is a comment in the data collection setting information included in the managed data information 330 in FIG. 2. A transmission destination indicates an external device 20 that is a destination of transmission of data represented by a data name.

In one example, the data processing setting generating unit 38 obtains a data name and a comment from a record extracted from the data collection setting information, registers the obtained data name and comment, and adds, to the data transmission setting information 390, a record in which the transmission cycle and the transmission destination are blank. In a case where a plurality of records are extracted, a similar process is performed on all the records. The data processing setting generating unit 38 displays, on the display unit 32, the data transmission setting information 390 as illustrated in FIG. 4. Specifically, the data processing setting generating unit 38 performs the process of adding the data name of transmission data to the data transmission setting information 390, and displaying, on the display unit 32, the data transmission setting information 390 having the data name added.

When the data transmission setting information 390 illustrated in FIG. 4 is displayed on the display unit 32, the user inputs a transmission cycle and a transmission destination of each record via the input unit 31 to thereby complete the data transmission setting information 390. FIG. 5 is a table illustrating an example of the data transmission setting information according to the first embodiment. As compared with the case of FIG. 4, FIG. 5 illustrates the data transmission setting information having the transmission cycles and the transmission destinations input. The transmission cycles and the transmission destinations input to the fields may be those which are directly input by the user or those which are selected from a preset list. Only one transmission cycle and only one transmission destination may be set for the data transmission setting information 390. In this case, the user may input the transmission cycle and the transmission destination only once. When the user completes the input of the transmission cycle and the transmission destination, the data processing setting generating unit 38 updates, in accordance with the content input by the user, the data transmission setting information 390 stored in the data transmission setting information storage unit 39.

In the case of the data transmission setting information 390 including the field names as illustrated in FIG. 4, the data processing setting generating unit 38 can generate records of the data transmission setting information 390 having at least the data names and the comments filled with data extracted from the data collection setting information. The data processing setting generating unit 38 may generate records having predetermined default values set for the transmission cycles and the transmission destinations. In one example, the data processing setting generating unit 38 may set, as a transmission cycle, the slowest collection cycle in all the records extracted as transmission data from the data collection setting information. In setting a transmission cycle, the data processing setting generating unit 38 may obtain a collection cycle of a record extracted from the data collection setting information and corresponding to a record to be registered in the data transmission setting information 390, and set a value equal to or larger than the obtained collection cycle as a default value of the transmission cycle. Alternatively, the data processing setting generating unit 38 may determine a transmission cycle, by referring to set values of transmission cycles in previous records of the data transmission setting information 390. In one example, the data processing setting generating unit 38 can set a transmission cycle in a previous record, as a default value of a transmission cycle in a record to be newly added. Furthermore, a transmission destination may also be a predetermined default value or may be determined with reference to set values of transmission destinations in previous records of the data transmission setting information 390. In the manner discussed above, the data processing setting generating unit 38 can display, on the display unit 32, the data transmission setting information 390 as illustrated in FIG. 5. In this case, the user can still edit the content of the displayed data transmission setting information 390 via the input unit 31. In this case, it becomes possible to significantly reduce time and effort for a user to perform the input to the data transmission setting information 390.

Reference is made back to FIG. 1. The data transmission setting information storage unit 39 stores the data transmission setting information 390 having a record added by the data processing setting generating unit 38. As illustrated in FIG. 5, the data transmission setting information 390 is information defining a transmission condition, which includes a data name, a transmission cycle, and a transmission destination, for transmitting, to the external device 20, collected data stored in the collected data temporary storage unit 35 or the saved data storage unit 36.

On the basis of the data transmission setting information 390, the data transmission unit 40 transmits, to the external device 20, transmission data that is collected data stored in the collected data temporary storage unit 35 or the saved data storage unit 36.

Figure 6:
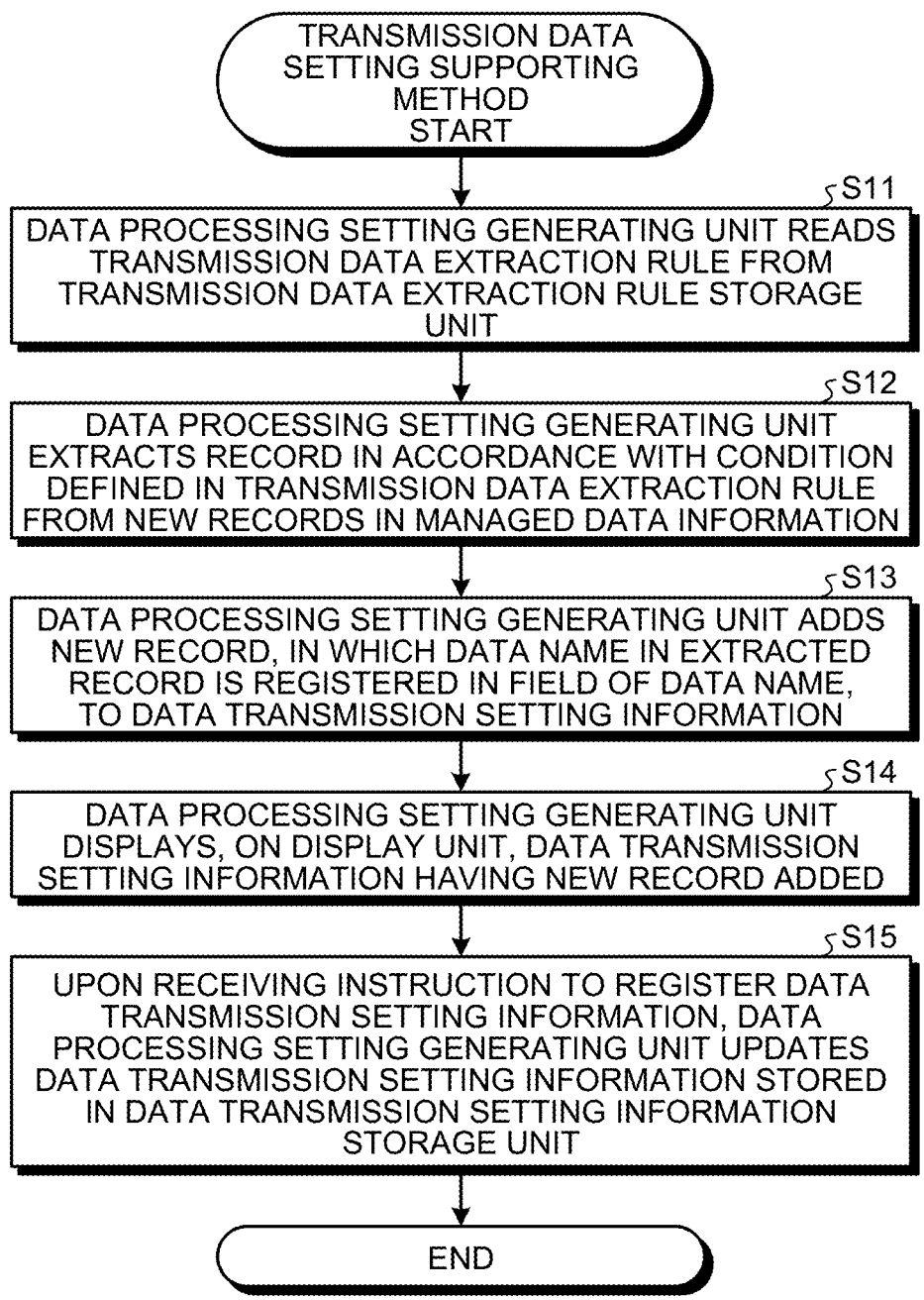
FIG. 6 is a flowchart illustrating an example of procedures of a transmission data setting supporting method according to the first embodiment.

Next, a transmission data setting supporting method of the gateway device 30 having the above-mentioned configuration will be explained. FIG. 6 is a flowchart illustrating an example of procedures of the transmission data setting supporting method according to the first embodiment. Assume that the user creates the transmission data extraction rule 370, using the attribute information in collected data, and the thus created transmission data extraction rule 370 is stored in the transmission data extraction rule storage unit 37.

The data processing setting generating unit 38 first reads the transmission data extraction rule 370 from the transmission data extraction rule storage unit 37 (step S11). Subsequently, the data processing setting generating unit 38 extracts a record in accordance with a condition defined in the transmission data extraction rule 370, from new records in the managed data information 330 (step S12). Thereafter, the data processing setting generating unit 38 adds, to the data transmission setting information 390, a new record in which the data name in the extracted record is registered in the field of the data name (step S13). Subsequently, the data processing setting generating unit 38 displays, on the display unit 32, the data transmission setting information 390 having the new record added (step S14). Note that, in the case of the data transmission setting information 390 in FIG. 4, the data processing setting generating unit 38 registers the comment in the extracted record, into the field of the comment in the new record.

Thereafter, the user edits the content of the data transmission setting information 390 displayed on the display unit 32. In one example, a transmission cycle and a transmission destination are set in the data transmission setting information 390. As a result, the necessary content is input to the data transmission setting information 390. After completing the editing, the user instructs the data processing setting generating unit 38 to register the data transmission setting information 390. Upon receiving the instruction to register the data transmission setting information 390, the data processing setting generating unit 38 updates the data transmission setting information 390 stored in the data transmission setting information storage unit 39 (step S15). Specifically, the data processing setting generating unit 38 reflects the information edited by the user in the data transmission setting information 390 stored in the data transmission setting information storage unit 39. As a result, the transmission data setting supporting method is terminated.

A specific example of the transmission data setting supporting method will now be explained. Assume that the data transmission setting information 390 is generated in accordance with a condition defined with the number "1" in the transmission data extraction rule 370 in FIG. 3. The condition defined with the number "1" in the transmission data extraction rule 370 in FIG. 3 reads "'production volume' is included as data name in data collection setting information". The data processing setting generating unit 38 extracts records with the numbers "1", "2", "6", and "7" as records having their data names including "production volume" in the managed data information 330 in FIG. 2. Subsequently, the data processing setting generating unit 38 registers the data names and the comments in the extracted records, in the fields of data names and comments in the data transmission setting information 390. As a result, as illustrated in FIG. 4, the records with the numbers "1" to "4" are registered. The same is applicable to the other conditions defined in FIG. 3. The data processing setting generating unit 38, however, does not register a record having the same data name as that in a record already registered in the data transmission setting information 390. The data processing setting generating unit 38 then displays, on the display unit 32, the data transmission setting information 390 having the data names and comments registered, as illustrated in FIG. 4.

Next, an outline of a data transmitting process of the gateway device 30 will be explained. The data collecting unit 34 collects data from the devices 10 on the basis of the data collection setting information, and stores the collected data in the collected data temporary storage unit 35. When the data collection setting information sets the collected data as data that should be saved in the form of files, the data collecting unit 34 stores the collected data in the form of files in the saved data storage unit 36. Thereafter, on the basis of the data transmission setting information 390 in the data transmission setting information storage unit 39 generated in accordance with the procedures in FIG. 6, the data transmission unit 40 transmits the collected data stored in the collected data temporary storage unit 35 or the saved data storage unit 36 to an external device 20. Specifically, referring to the transmission cycle and the transmission destination set in the data transmission setting information 390, the data transmission unit 40 transmits the collected data in the set transmission cycle, to the external device 20 that is the set transmission destination.

Although the above description has been made as to the transmission data extraction rule 370 generated using the attribute information in data included in the data collection setting information, the attribute information in data included in cross-reference information of PLCs from which to collect data may be used. The cross-reference information is information indicating data and the position where the data is used. Specifically, the cross-reference information is information including the relation between data and a program that uses the data and is executed by a PLC, i.e., a device 10.

The cross-reference information is generated by an engineering tool when a computer system having the engineering tool installed therein is connected to the PLC. Note that the cross-reference information can be stored in a portable non-volatile storage medium such as a memory card and the portable non-volatile storage medium can be inserted in the gateway device 30, so that the data processing setting generating unit 38 can refer to the cross-reference information. Alternatively, the gateway device 30 can have a configuration capable of communicating through the network 60 with a computer system having the cross-reference information stored therein, so that the data processing setting generating unit 38 can refer to the cross-reference information in the computer system.

FIG. 7 is a table illustrating an example of the cross-reference information according to the first embodiment. Cross-reference information 335 includes records indicating which program to be executed by a PLC uses the data used in the PLC. One record is made up of by a plurality of fields. The name of a field is a field name. In the example of FIG. 7, the field names include a number, a data name, an address, a data type, a comment, and a reference. In addition, a record is a set of data including a number, a data name, an address, a data type, a comment, and a reference, all of which are the fields.

A number is identification information assigned to data included in the cross-reference information 335. A data name is the name of data used in a PLC from which data is to be collected. An address indicates a position in a memory of a PLC, and data represented by a data name is stored at that position. A data type indicates the type of data represented by a data name. A comment indicates a comment added for data represented by a data name. A reference indicates the name of a program that uses data represented by a data name.

A specific example in which the data transmission setting information 390 is generated using attribute information included in the cross-reference information 335 will be described. FIG. 8 is a table illustrating another example of the transmission data extraction rule according to the first embodiment. In FIG. 8, a record with the number "4" in which the condition "data used in 'facility A monitoring program' of PLC" is input to the content is added to the transmission data extraction rule 370 of FIG. 3.

In this case, the data processing setting generating unit 38 extracts records with the numbers "1", "2", "3", and "5" as records including "facility A monitoring program" in the reference in the cross-reference information 335 in FIG. 7. Subsequently, the data processing setting generating unit 38 extracts records including the data names included in the data collection setting information or the managed data information 330 of FIG. 2 from among the records extracted from the cross-reference information 335 of FIG. 7. In this case, the data names in the records extracted from FIG. 7 are "production volume A", "target production volume A", "stop signal A", and "cycle time A". These data names are all included in the managed data information 330 in FIG. 2. Thus, the data processing setting generating unit 38 sets the data names and the comments in these records as candidates for registration in the data transmission setting information 390. However, these pieces of data are not registered because the same data are already registered in the records with the numbers "1", "2", "5", and "6" of the data transmission setting information 390 in FIG. 4.

In the first embodiment, the data processing setting generating unit 38 obtains records that satisfy the transmission data extraction rule 370 set by the user, from the data collection setting information or from both the cross-reference information 335 and the data collection setting information, and adds the data names in the obtained records to the data transmission setting information 390. The data processing setting generating unit 38 then displays, on the display unit 32, the data transmission setting information 390 having the records added. This reduces conventional time and effort for a user to check each piece of data in determining which data should be transmitted to the outside. In other words, this assists the user in generating the data transmission setting information 390 in the gateway device 30 for setting data to be transmitted to external devices 20.

In addition, the data processing setting generating unit 38 may set the slowest collection period in the extracted records as a transmission cycle in the data transmission setting information 390. Furthermore, the data processing setting generating unit 38 may set a collection cycle and a transmission destination set in a previously registered record, as a collection cycle and a transmission destination in the data transmission setting information 390. This further reduces time and effort for the user to set the data transmission setting information 390.

Second Embodiment

The second embodiment gives an example in which the transmission data extraction rule 370 is generated using information on logging setting of data such as a collection cycle, a retention period, etc. of the data.

Because the configurations of the data transmission system 1 and the gateway device 30 according to the second embodiment are similar to those in the first embodiment, the description thereof will not be repeated. In the gateway device 30 of the second embodiment, however, the managed data information 330 or the data collection setting information is managed by the gateway device 30 and includes the information relating to logging setting as the attribute information in data to be collected. The information relating to logging setting is the collection cycle, the retention period, etc. of the data.

FIG. 9 is a table illustrating an example of the managed data information according to the second embodiment. A record of the managed data information 330 is a set of data including a number, a data name, a connected device, an address, a data type, a collection cycle, a retention period, and a comment as the fields. In the example of FIG. 9, the field names include a number, a data name, a connected device, an address, a data type, a collection cycle, a retention period, and a comment. Note that the description of items that are the same as those in FIG. 2 of the first embodiment will not be repeated. A collection cycle is a cycle in which data represented by a data name is collected. A retention period is a period for which data represented by a data name is saved. The collection cycle and the retention period are information relating to logging setting.

In addition, the transmission data extraction rule 370 can use the information relating to logging setting in addition to the attribute information described in the first embodiment. In one example, the attribute information used in a condition is information that is at least one of a collection cycle and a retention period of data in the data collection setting information or the managed data information 330.

FIG. 10 is a table illustrating an example of the transmission data extraction rule according to the second embodiment. Note that the description of parts that are the same as those in FIG. 3 will not be repeated. In this example, a condition of "data with retention period of 30 days or longer" is stored in the content of the record with the number "1". In a case where an external device 20 is a cloud server, the cloud server often takes measures against troubles or disasters by, for example, saving data in two data centers. Thus, data to be saved for a long period may be stored in a cloud server. In addition, this means that data saved for a long period can be determined to be important data. Similarly, data with a collection cycle longer than a predetermined period are also considered to be important data. The user can therefore create the transmission data extraction rule 370 on the basis of determination that data are to be transmitted to an external device 20 when the retention period or the collection cycle is longer than a predetermined period. The predetermined period is freely determined by the user depending on the configurations of the devices 10.

Note that, in a case where a condition for saving data for a retention period longer than the predetermined period is set in the transmission data extraction rule 370, the data processing setting generating unit 38 may set such a cloud server as the default value of the transmission destination of the record including the data name and the comment to be registered in the data transmission setting information 390.

Next, a specific example of generation of the data transmission setting information 390 in the second embodiment will be described. The data processing setting generating unit 38 first reads the condition of "data with retention period of 30 days or longer" in the transmission data extraction rule 370 of FIG. 10. Subsequently, the data processing setting generating unit 38 extracts, from the managed data information 330 of FIG. 9, records that satisfy the read condition. In this case, the data processing setting generating unit 38 extracts a record with the number "2" in which the retention period is "30 days". The data processing setting generating unit 38 then obtains a data name and a comment from the extracted record, and registers the obtained data name and comment in the data transmission setting information 390 such that a new record having the obtained data name and comment is newly added to the data transmission setting information 390. The data transmission setting information 390 including the thus added records is then displayed on the display unit 32.

In the second embodiment, records are extracted from the data collection setting information in accordance with the transmission data extraction rule 370 created using the information included in the logging setting, and new records including the information in the extracted records are added to the data transmission setting information 390. Typically, because data with a long retention period or collection cycle is often important data, the user can select, from the attribute information in data in the data collection setting information, transmission data to be transmitted to an external device 20, using the retention period or the collection cycle relating to logging setting. As the transmission data extraction rule 370 is defined using information relating to logging setting, it become possible to further reduce time and effort for a user to extract transmission data from collected data, as compared with the first embodiment. As a result, it becomes possible to provide a user with an environment that efficiently creates the transmission data extraction rule 370.

Third Embodiment

In a third embodiment, a description will be made as to a gateway device capable of learning previous records registered in the data transmission setting information 390, and generating records or, more specifically, data names for the data transmission setting information 390 from the data collection setting information or the cross-reference information 335.

Figure 11:
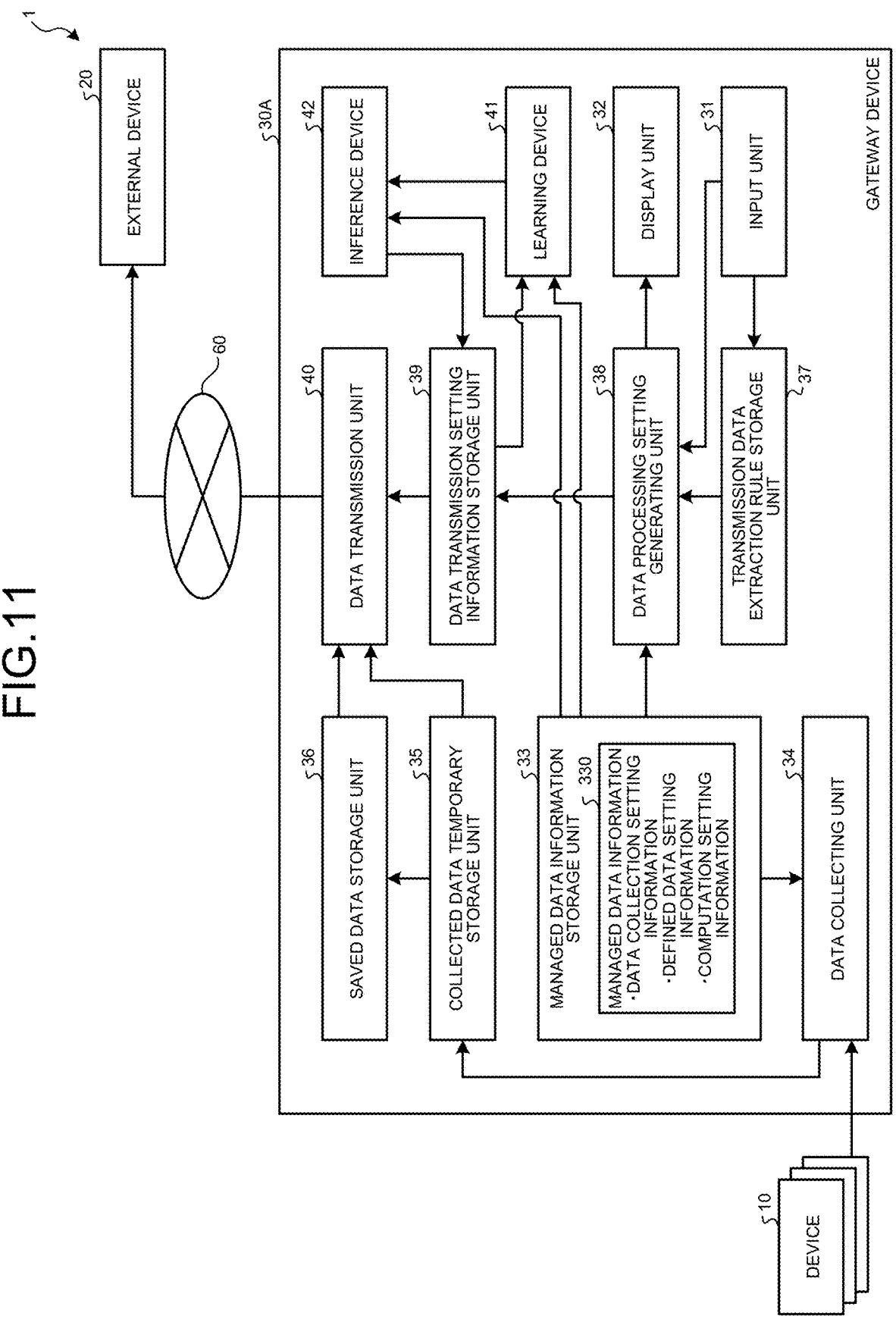
FIG. 11 is a block diagram illustrating an example of a configuration of a data transmission system including a gateway device according to a third embodiment.

FIG. 11 is a block diagram illustrating an example of a configuration of a data transmission system including a gateway device according to the third embodiment. Hereinafter, differences from FIG. 1 in the first embodiment will be described, components that are the same as those in FIG. 1 will be represented by the same reference numerals and the description thereof will not be repeated. A gateway device 30A further includes a learning device 41 and an inference device 42.

Figure 12:
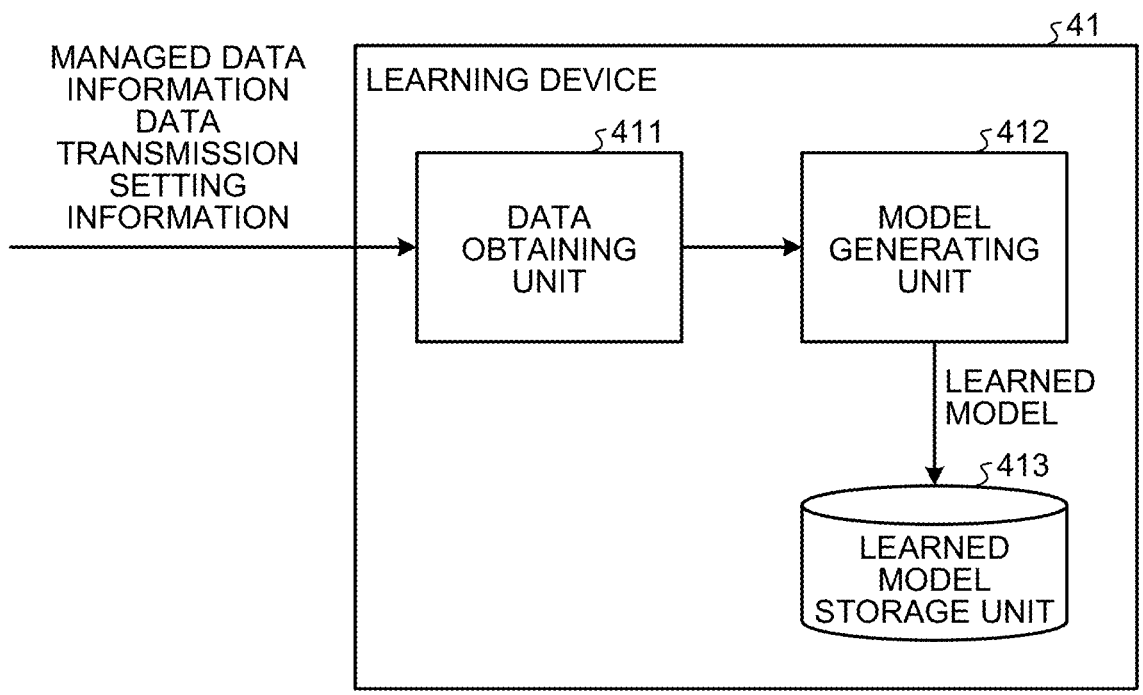
FIG. 12 is a block diagram illustrating an example of a configuration of a learning device according to the third embodiment.

FIG. 12 is a block diagram illustrating an example of a configuration of the learning device according to the third embodiment. The learning device 41 includes a data obtaining unit 411, a model generating unit 412, and a learned model storage unit 413.

The data obtaining unit 411 obtains, as learning data, the data collection setting information stored in the managed data information storage unit 33 and the data transmission setting information 390 stored in the data transmission setting information storage unit 39. The data transmission setting information 390 is previously registered records. The managed data information 330, instead of the data collection setting information, may be obtained as data for learning.

Note that, when the data names in the data collection setting information and the data transmission setting information 390 have some common part that can be generalized in regular expression, etc., a generalization process may be applied as preprocessing of data. For example, assume that there are data names "facility A operation rate", "facility B operation rate", and "equipment B operation rate". In this case, the data names "facility A operation rate", "facility B operation rate", and "equipment B operation rate" in the data collection setting information and the data transmission setting information 390 can be grouped as "*operation rate" where "*" is defined as representing text.

On the basis of learning data created on the basis of combination of the data collection setting information and the data transmission setting information 390 output from the data obtaining unit 411, the model generating unit 412 learns candidates for transmission data to be registered in the data transmission setting information 390. Specifically, a learned model for inferring optimum candidates for transmission data is generated from the data collection setting information and the data transmission setting information 390 is generated. Note that the learning data is data that associates the data collection setting information and the data transmission setting information 390 with each other.

Learning algorithms used by the model generating unit 412 can be known algorithms of supervised learning, unsupervised learning, reinforcement learning, etc. A description will be made as to where a neural network is applied. The model generating unit 412 learns the data transmission setting information 390 by so-called supervised learning in accordance with a neural network model, for example. Note that supervised learning refers to a technique of giving the learning device 41 data sets of inputs and results (labels), and allowing the learning device 41 to learn features of the learning data and infer a result from an input.

A neural network is made up of input layers defined by a plurality of neurons, intermediate layers (hidden layers) defined by a plurality of neurons, and output layers defined by a plurality of neurons. The number of intermediate layers may be one, or two or more.

Figure 13:
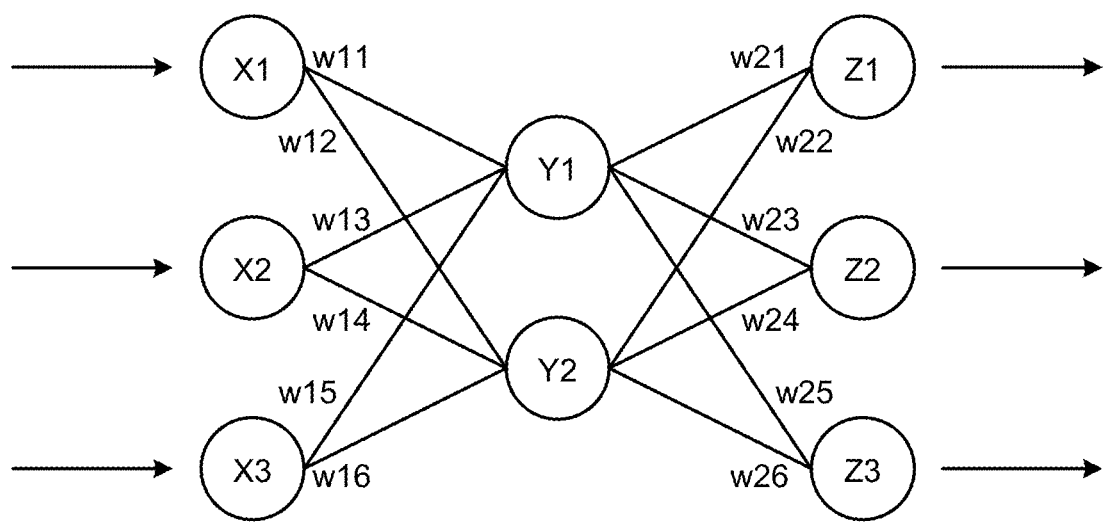
FIG. 13 is a diagram schematically illustrating an example of a neural network used in the third embodiment.

FIG. 13 is a diagram schematically illustrating an example of the neural network used in the third embodiment. For example, a neural network of three layers as illustrated in FIG. 13 is made up of an input layer including three neurons X1, X2, and X3, an intermediate layer including two neurons Y1 and Y2, and an output layer including three neurons Z1, Z2, and Z3. The neurons X1, X2, and X3 of the input layer are connected with the neurons Y1 and Y2 of the intermediate layer, and the neurons Y1 and Y2 of the intermediate layer are connected with the neurons Z1, Z2, and Z3 of the output layer. Although FIG. 13 illustrates, by way of example, the single intermediate layer, two or more intermediate layers may be provided.

When a plurality of inputs are input to the neurons X1, X2, and X3 of the input layer, the values thereof are multiplied by weights w11 to w16 and input to the neurons Y1 and Y2 of the intermediate layer, and the resulting values are further multiplied by weights w21 to w26 and output from the neurons Z1 to Z3 of the output layer. The output results vary depending on the values of the weights w11 to w16 and w21 to w26.

In the third embodiment, the neural network learns candidates for transmission data through so-called supervised learning in accordance with the learning data created on the basis of combination of the data collection setting information and the data transmission setting information 390 obtained by the data obtaining unit 411.

Specifically, the neural network performs the learning by adjusting the weights w11 to w16 and w21 to w22 so that the results output from the output layer when the data collection setting information is input to the input layer become closer to the records of the data transmission setting information 390, which are correct solutions.

The model generating unit 412 generates a learned model through the learning as described above, and outputs the learned model.

The learned model storage unit 413 stores the learned model output from the model generating unit 412.

Figure 14:
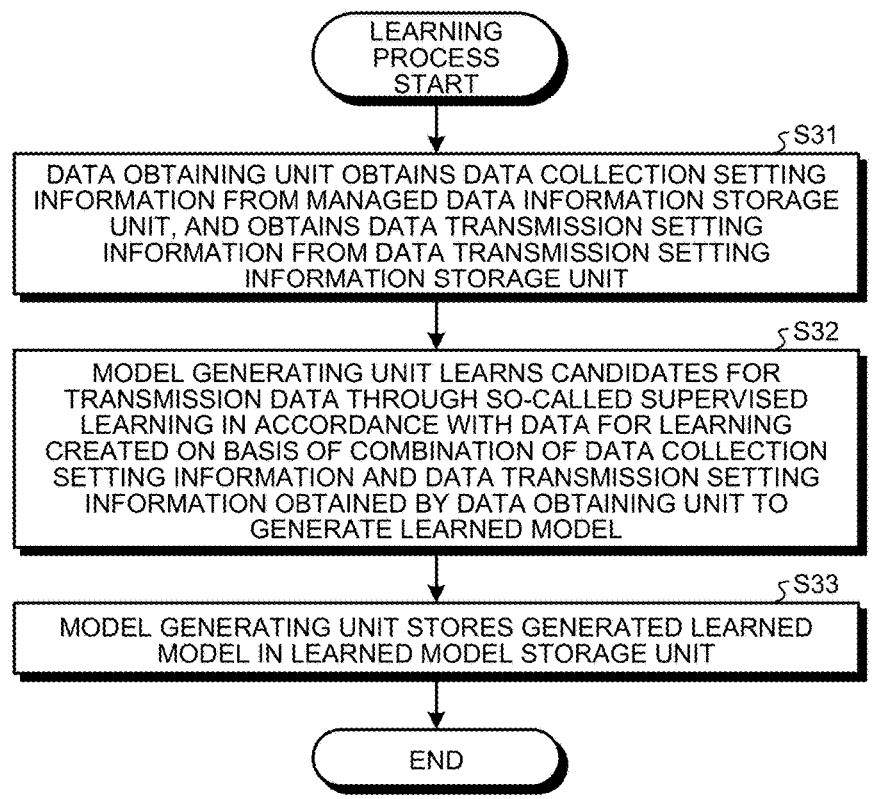
FIG. 14 is a flowchart illustrating an example of procedures of a learning process performed by the learning device according to the third embodiment.

Next, a learning process performed by the learning device 41 will be described. FIG. 14 is a flowchart illustrating an example of procedures of the learning process performed by the learning device according to the third embodiment.

The data obtaining unit 411 first obtains the data collection setting information from the managed data information storage unit 33, and obtains the data transmission setting information 390 from the data transmission setting information storage unit 39 (step S31). While the data obtaining unit 411 simultaneously obtains the data collection setting information and the data transmission setting information 390 in step 31, the data collection setting information and the data transmission setting information 390 can be input to the data obtaining unit 411 in association with each other. For example, the data obtaining unit 411 can obtain data on the data collection setting information and the data transmission setting information 390 at different timings.

Subsequently, the model generating unit 412 generates a learned model by learning candidates for transmission data through so-called supervised learning in accordance with the learning data created on the basis of the combination of the data collection setting information and the data transmission setting information 390 obtained by the data obtaining unit 411 (step S32).

Thereafter, the model generating unit 412 stores the generated learned model in the learned model storage unit 413 (step S33). The learning process is terminated.

Figure 15:
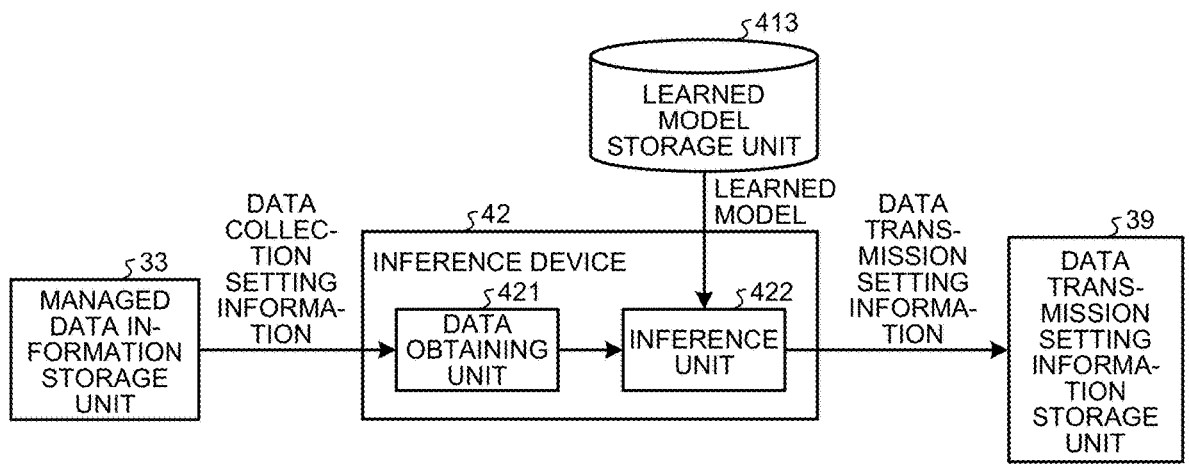
FIG. 15 is a block diagram illustrating an example of a configuration of an inference device according to the third embodiment.

FIG. 15 is a block diagram illustrating an example of a configuration of the inference device according to the third embodiment. The inference device 42 includes a data obtaining unit 421 and an inference unit 422.

The data obtaining unit 421 obtains the data collection setting information from the managed data information storage unit 33.

The inference unit 422 infers candidates for transmission data obtained by using the learned model. Specifically, when the data collection setting information obtained by the data obtaining unit 421 is input to the learned model, the inference unit 422 can output candidates for transmission data inferred from the data collection setting information.

While the third embodiment has been described giving the example in which the learned model learned by the model generating unit 412 of the gateway device 30A is used to output candidates for transmission data, a learned model may be obtained from outside such as from another gateway device 30A, and candidates for transmission data may be output on the basis of the learned model.

Figure 16:
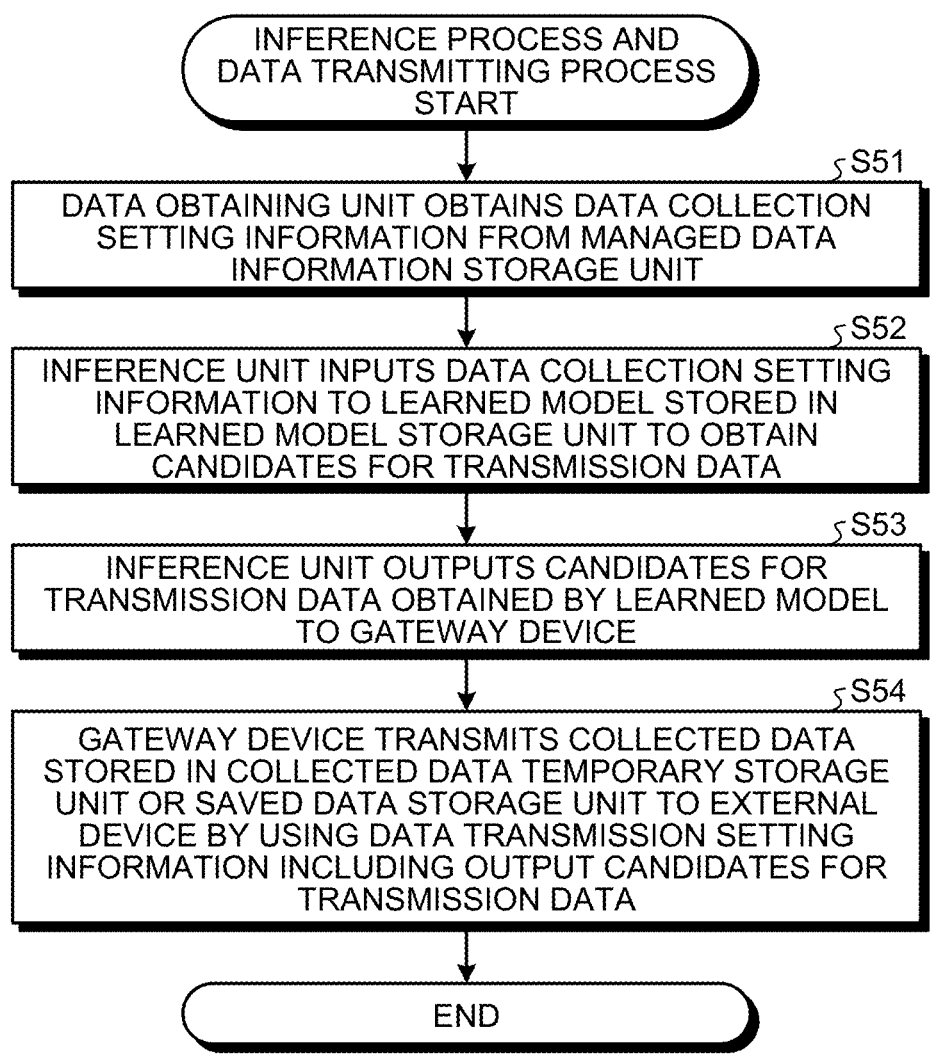
FIG. 16 is a flowchart illustrating an example of procedures of an inference process and a data transmitting process performed by the gateway device according to the third embodiment.

Next, an inference process performed by the inference device 42 will be described. FIG. 16 is a flowchart illustrating an example of procedures of the inference process and a data transmitting process performed by the gateway device according to the third embodiment.

The data obtaining unit 421 first obtains the data collection setting information from the managed data information storage unit 33 (step S51).

Subsequently, the inference unit 422 inputs the data collection setting information to the learned model stored in the learned model storage unit 413 to thereby obtain candidates for transmission data (step S52).

Thereafter, the inference unit 422 outputs, to the gateway device 30A, the candidates for transmission data obtained by the learned model (step S53). In one example, the candidates for transmission data are output to the data transmission setting information storage unit 39 of the gateway device 30A and added as records of the data transmission setting information 390.

Subsequently, using the data transmission setting information 390 including the output candidates for transmission data, the gateway device 30A transmits collected data stored in the collected data temporary storage unit 35 or the saved data storage unit 36 to an external device 20 (step S54). As a result of the procedure, records of the data transmission setting information 390, which is a list of data to be transmitted to external devices 20, can be automatically generated from the data collection setting information collected and managed by the gateway device 30A. The inference process and the data transmitting process are terminated.

While, in the third embodiment, supervised learning is applied to a learning algorithm used by the model generating unit 412, the learning algorithm is not limited thereto. Instead of supervised learning, reinforcement learning, unsupervised learning, semi-supervised learning, or the like is applicable to the learning algorithm.

In addition, the model generating unit 412 may learn candidates for transmission data in accordance with learning data created for a plurality of gateway devices 30A. Note that to learn candidates for transmission data, the model generating unit 412 may obtain learning data from a plurality of gateway devices 30A used in one area, or may use learning data collected from a plurality of gateway devices 30A that independently operate in different areas. In addition, a gateway device 30A from which to collect learning data may be added or removed during the collection. Furthermore, the learning device 41 that has learned candidates for transmission data for one gateway device 30A may be applied to another gateway device 30A, and candidates for transmission data for the latter gateway device 30A may be relearned and updated.

Alternatively, for the learning algorithm used by the model generating unit 412, deep learning for learning extraction of feature quantities themselves can be used, and machine learning may be performed in accordance with other known methods such as genetic programming, functional logic programming, or support vector machine, for example.

Furthermore, the learning device 41 is used to learn candidates for transmission data, and the inference device 42 is used to infer candidates for transmission data. While FIG. 11 illustrates an example in which the learning device 41 and the inference device 42 are built in the gateway device 30A, the learning device 41 and the inference device 42 may be connected with the gateway device 30A via the network 60, for example. That is, the devices 41, 42 may be separate from the gateway device 30A. In addition, the learning device 41 and the inference device 42 may be present in a cloud server.

As described above, the learning device 41, which is provided in the gateway device 30A, generates frequency ranks or extract common parts of previous records in the data transmission setting information 390, thereby generating a learned model. Alternatively, an extraction rate may be calculated from a set of the data collection setting information and the data transmission setting information 390, and a learned model that uses data having high extraction rates as transmission data may be generated. Note that candidates for transmission data, which are a result of inference performed by the inference device 42, may be displayed on the display unit 32. When the thus displayed candidates includes a candidate unsuitable for user's intention, the user can delete such a candidate via the input unit 31.

In the third embodiment, the gateway device 30A includes the learning device 41 that generates a learned model that outputs candidates for transmission data by using, as a data set, the data collection setting information and the already generated data transmission setting information 390. The gateway device 30A also includes the inference device 42 that infers candidates for transmission data from a result obtained when the data collection setting information is input to the generated learned model. As a result, a new record of the data transmission setting information 390 based on the candidates for transmission data is automatically generated. It thus becomes possible to further recue time and effort for a user to create the data transmission setting information 390, as compared with the first embodiment. In particular, because the user need not create the transmission data extraction rule 370, the number of processes for creating the data transmission setting information 390 can be reduced.

Fourth Embodiment

The first embodiment discusses generating the data transmission setting information 390 for extracting transmission data to be transmitted to an external device 20 from collected data collected by the data collecting unit 34. The gateway device 30 can perform computation, using collected data, and include computed data, i.e., data resulting from the computation, in transmission data. In a fourth embodiment, a description will be made as to a data transmission system including a gateway device capable of supporting generation of the data transmission setting information 390 in a case where transmission data includes not only collected data but also computed data, and a transmission data setting supporting method will be described.

Figure 17:
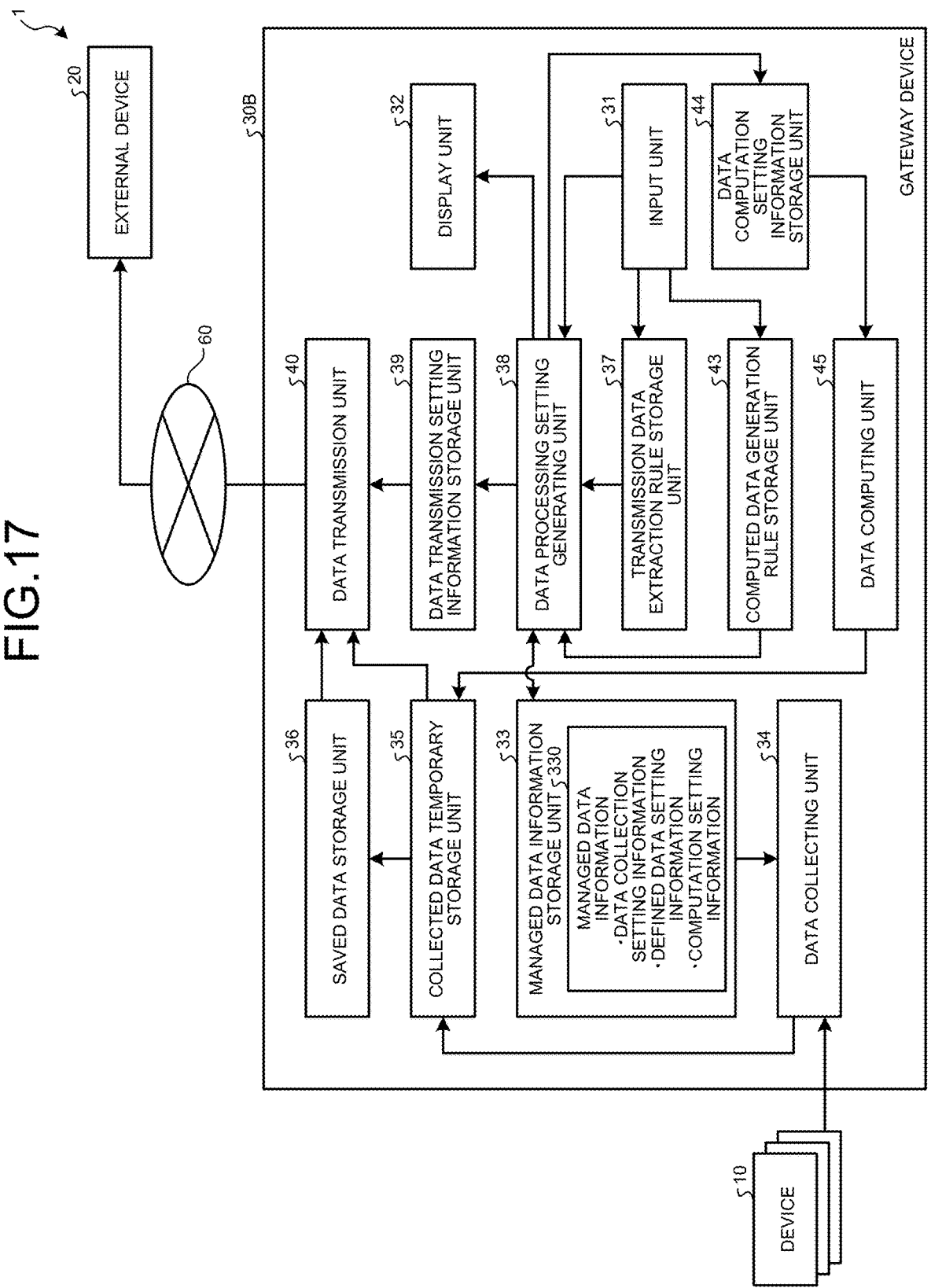
FIG. 17 is a block diagram illustrating an example of a configuration of a data transmission system including a gateway device according to a fourth embodiment.

FIG. 17 is a block diagram illustrating an example of a configuration of a data transmission system including a gateway device according to the fourth embodiment. Hereinafter, differences from FIG. 1 in the first embodiment will be described, components that are the same as those in FIG. 1 will be represented by the same reference numerals and the description thereof will not be repeated. The gateway device 30B further includes a computed data generation rule storage unit 43, a data computation setting information storage unit 44, and a data computing unit 45.

The computed data generation rule storage unit 43 stores a computed data generation rule, which is a rule defining computation of transmission data to be transmitted to an external device 20. The computed data generation rule defines the computation of computed data when the computed data, which is data computed using at least one of collected data and data managed by the gateway device 30, is to be transmitted to an external device 20. In other words, the computed data generation rule is defined when computation is performed in the gateway device 30B, and computed data, which is a result of the computation, is set as transmission data to be transmitted to an external device 20. In one example, the computed data generation rule is input by the user via the input unit 31.

FIG. 18 is a table illustrating an example of the computed data generation rule according to the fourth embodiment. Note that, in the example of FIG. 18, for ease of understanding, the rule is expressed in texts. The computed data generation rule 430 includes records each having a content that defines computation performed using data included in the managed data information 330. One record is made up of a plurality of fields. The name of a field is a field name. In the example of FIG. 18, the field names include a number and a content. A record is a set of data having a number and a content as fields. A number is identification information assigned to a record included in the computed data generation rule 430. A content defines computation using a data name included in the managed data information 330. In one example, a content is expressed by using a data name in the managed data information 330.

Reference is made back to FIG. 17. The data computation setting information storage unit 44 stores data computation setting information that defines the relation between an arithmetic expression and a data name. An arithmetic expression is data which the data processing setting generating unit 38 generates in accordance with a content of the computed data generation rule 430, using data in the managed data information 330. A data name is a data name assigned to an arithmetic expression. FIG. 19 is a table illustrating an example of the data computation setting information according to the fourth embodiment. The data computation setting information 440 includes records each having a content of computation performed by the gateway device 30B. One record is made up of a plurality of fields. The name of a field is a field name. In the example of FIG. 19, the field names include a number, a content of computation, and a computation result. A record is a set of data having a number, a content of computation, and a computation result as fields.

A number is identification information assigned to a record included in the data computation setting information 440. A content of computation expresses a content of the computed data generation rule 430 in an arithmetic expression using a data name in the managed data information 330. A computation result is a data name assigned to a value obtained by an arithmetic expression of a content of computation. As described above, the data computation setting information 440 is information defining computation used in the gateway device 30B. Examples of the computation include, in addition to averaging, summing, maximization, and minimization, key performance indicators (KPIs) such as a progression rate.

Reference is made back to FIG. 17. The data computing unit 45 performs computation on the basis of the data computation setting information 440 in the data computation setting information storage unit 44, and stores a value obtained as a result of the computation as computed data, into the collected data temporary storage unit 35. The data computing unit 45 performs computation, using collected data stored in the collected data temporary storage unit 35 or the saved data storage unit 36.

In addition to the functions of the data processing setting generating unit 38 in the first embodiment, the data processing setting generating unit 38 has a function of adding a record including an arithmetic expression and a computation result to the data computation setting information 440. The data processing setting generating unit 38 generates the arithmetic expression in accordance with the computed data generation rule 430, using data in the managed data information 330. The computation result is a data name to be assigned to the arithmetic expression. The data processing setting generating unit 38 has a function of storing the generated data computation setting information 440 in the data computation setting information storage unit 44. The data processing setting generating unit 38 also has a function of adding a record including a data name to the managed data information 330 in the managed data information storage unit 33 and the data transmission setting information 390 in the data transmission setting information storage unit 39. This data name is a computation result included in the data computation setting information 440. The data processing setting generating unit 38 further has a function of displaying, on the display unit 32, the data transmission setting information 390 including the added record.

FIG. 20 is a table illustrating an example of the managed data information according to the fourth embodiment. Because the configuration of the managed data information 330 is similar to that in FIG. 2, the description thereof will not be repeated. In FIG. 20, records with the numbers "11" and "12" are added to the managed data information 330 of FIG. 2. The records with the numbers "11" and "12" each have, as a data name, a computation result of the data computation setting information 440 of FIG. 19 generated by the data processing setting generating unit 38. The data types of these records are determined by the data processing setting generating unit 38 on the basis of the data types of collected data and operators used in arithmetic expressions defined by data computation setting. In one example, in a case of division of data of the integer type, such information as the data type being a real type is preset, and the data type can be determined on the basis of the information. In addition, the data processing setting generating unit 38 can use, as the collection period of the aforementioned records, a collection cycle of collected data used in an arithmetic expression defined by data computation setting.

FIG. 21 is a table illustrating an example of the data transmission setting information according to the fourth embodiment. Because the configuration of the data transmission setting information 390 is similar to that in FIG. 5, the description thereof will not be repeated. In FIG. 21, records with the numbers "9" and "10" are added to the data transmission setting information 390 of FIG. 5. The records with the numbers "9" and "10" each have, as a data name, a computation result of the data computation setting information 440 of FIG. 19 generated by the data processing setting generating unit 38.

Figure 22:
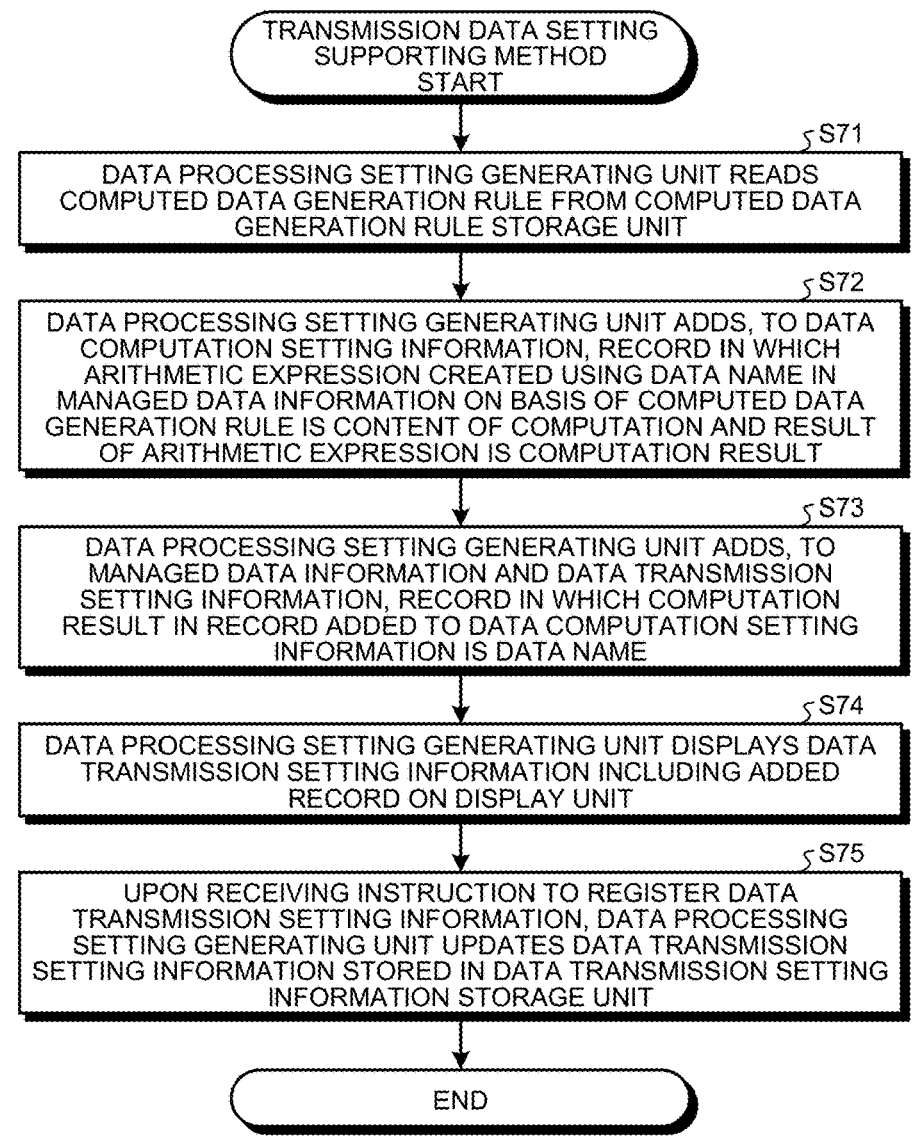
FIG. 22 is a flowchart illustrating an example of procedures of a transmission data setting supporting method according to the fourth embodiment.

Next, a transmission data setting supporting method of the gateway device 30B having such a configuration will be explained. FIG. 22 is a flowchart illustrating an example of procedures of the transmission data setting supporting method according to the fourth embodiment. Assume that the user creates the computed data generation rule 430, using a data name in the managed data information 330, and the created the computed data generation rule 430 is stored in the computed data generation rule storage unit 43. In addition, assume that transmission data to be transmitted to an external device 20 is computed data obtained by computation using collected data.

The data processing setting generating unit 38 first reads the computed data generation rule 430 from the computed data generation rule storage unit 43 (step S71). Subsequently, the data processing setting generating unit 38 adds a record to the data computation setting information 440. This added record is defined by a content of computation and a computation result, the content of computation being an arithmetic expression created using a data name in the managed data information 330 on the basis of the computed data generation rule 430, the computation result being a result of the arithmetic expression (step S72). The data processing setting generating unit 38 adds, to the managed data information 330 and the data transmission setting information 390, a record having a data name that is the computation result of the record added to the data computation setting information 440 (step S73).

Subsequently, the data processing setting generating unit 38 displays, on the display unit 32, the data transmission setting information 390 including the added record (step S74). Thereafter, the user edits the data transmission setting information 390 displayed on the display unit 32 as necessary. In one example, the user deletes an unnecessary computation result and sets a transmission cycle and a transmission destination. This inputs necessary information to the data transmission setting information 390. After completing editing, the user instructs the data processing setting generating unit 38 to register the data transmission setting information 390. Upon receiving the instruction to register the data transmission setting information 390, the data processing setting generating unit 38 updates the data transmission setting information 390 stored in the data transmission setting information storage unit 39 (step S75). As a result, the transmission data setting supporting method is terminated.

A specific example of the transmission data setting supporting method will now be explained. Assume that the data computation setting information 440 is generated in accordance with a condition defined with the number "1" in the computed data generation rule 430 of FIG. 18. A content defined with the number "1" in the computed data generation rule 430 of FIG. 18 reads "divide data with data name ("production volume"+symbol) by ("target production volume"+symbol), and set result as data name ("progression rate"+symbol)". Referring to the managed data information 330 of FIG. 2, the data processing setting generating unit 38 generates a content of computation conforming to the content of the rule 430. For example, the data processing setting generating unit 38 extracts, from the managed data information 330 of FIG. 2, a record with the number "1" having the data name "production volume A", a record with the number "2" having the data name "target production volume A", a record with the number "6" having the data name "production volume B", and a record with the number "7" having the data name "target production volume B".

Subsequently, the data processing setting generating unit 38 generates, as a content of computation, an arithmetic expression "production volume A/target production volume A" in accordance with the content of the number "1" in the computed data generation rule 430, and assigns a computation result "progression rate A" thereto. Similarly, the data processing setting generating unit 38 generates, as a content of computation, an arithmetic expression "production volume B/target production volume B", and assigns a computation result "progression rate B" thereto. The data processing setting generating unit 38 then registers, in the data computation setting information 440, the record, i.e., the generated combination of the arithmetic expression and the computation result. This results in the data computation setting information 440 as illustrated in FIG. 19.

Furthermore, the data processing setting generating unit 38 adds, to the managed data information 330, a record having a data name that is the computation result added to the arithmetic expression. As a result, as illustrated in FIG. 20, a record with the number "11" having the data name "progression rate A" and a record with the number "12" having the data name "progression rate B" are added to the managed data information 330. Furthermore, the data processing setting generating unit 38 also adds, to the data transmission setting information 390, the record having the data name that is the computation result added to the arithmetic expression. As a result, as illustrated in FIG. 21, a record with the number "9" having the data name "progression rate A" and a record with the number "10" having the data name "progression rate B" are added to the data transmission setting information 390.

Thereafter, the data processing setting generating unit 38 displays, on the display unit 32, the data transmission setting information 390 having the records added. The user edits the data transmission setting information 390 as necessary. When the user instructs the data processing setting generating unit 38 to resister the data transmission setting information 390, the data processing setting generating unit 38 updates the data transmission setting information 390 in the data transmission setting information storage unit 39.

Next, an outline of a data transmitting process of the gateway device 30B will be explained. Because transmission of collected data to an external device 20 has been described in the first embodiment, an outline of a process of transmitting computed data will be described hereinbelow.

The data collecting unit 34 collects data from the devices 10 on the basis of the data collection setting information, and stores the collected data in the collected data temporary storage unit 35. When the data collection setting information sets the collected data as data that should be saved in the form of files, the data collecting unit 34 stores the collected data in the form of files in the saved data storage unit 36.

Thereafter, the data computing unit 45 performs computation using collected data stored in the collected data temporary storage unit 35 or the saved data storage unit 36 on the basis of the data computation setting information 440, and stores computed data, which is a computation result, in the collected data temporary storage unit 35. Note that, when the managed data information 330 sets the computed data as data that should be saved in the form of files, the data computing unit 45 stores the computed data in the form of files in the saved data storage unit 36. The data transmission unit 40 transmits, to an external device 20, computed data stored in the collected data temporary storage unit 35 or the saved data storage unit 36 on the basis of the data transmission setting information 390.

In the fourth embodiment, the data processing setting generating unit 38 creates an arithmetic expression using a data name in the managed data information 330 on the basis of the computed data generation rule 430, and adds a record associating the arithmetic expression with a computation result to the data computation setting information 440. In addition, the data processing setting generating unit 38 adds, to the managed data information 330 and the data transmission setting information 390, a record having a data name that is the computation result added to the arithmetic expression. The data computing unit 45 performs computation using collected data stored in the collected data temporary storage unit 35 or the saved data storage unit 36 on the basis of the data computation setting information 440, and stores computed data obtained as a result of computation in the collected data temporary storage unit 35 or the saved data storage unit 36. On the basis of the data transmission setting information 390, the data transmission unit 40 then transmits, as transmission data, computed data stored in the collected data temporary storage unit 35 or the saved data storage unit 36, to the external device 20. As a result, only by generating the computed data generation rule 430, the user can transmit, to an external device 20, computed data resulting from computation performed by the gateway device 30B.

Specifically, in conventional art, the user is required to register an arithmetic expression and a computation result in the data computation setting information 440 and register, in the data transmission setting information 390, a data name associated with the computation result added to the arithmetic expression. In the fourth embodiment, however, the user only needs to generate the computed data generation rule 430, and the gateway device 30B automatically performs that processing, which produces an effect of reducing man-hours necessary for a user to perform setting for transmitting computed data to an external device 20.

Figure 23:
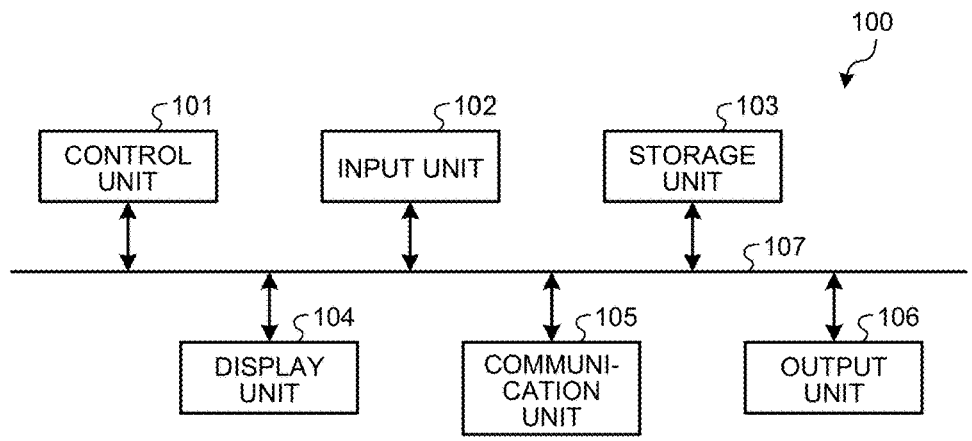
FIG. 23 is a diagram illustrating an example of a hardware configuration of a computer system that implements a gateway device according to the first to fourth embodiments.

A hardware configuration of the gateway devices 30, 30A, and 30B will now be described. Specifically, the gateway devices 30, 30A, and 30B according to the first to fourth embodiments are implemented by a computer system. FIG. 23 is a diagram illustrating an example of a hardware configuration of the computer system that implements a gateway device according to the first to fourth embodiments. As illustrated in FIG. 23, the computer system 100 includes a control unit 101, an input unit 102, a storage unit 103, a display unit 104, a communication unit 105, and an output unit 106, all of which are connected with one aother via a system bus 107.

In FIG. 23, the control unit 101 is a CPU, for example. The control unit 101 performs a transmission data setting support program describing the transmission data setting supporting method of the first to fourth embodiments. The input unit 102 is a keyboard, a mouse, and the like, and used by a user of the computer system 100 to input various information. The storage unit 103 includes various kinds of memories such as a random access memory (RAM) and a read only memory (ROM) and a storage device such as a hard disk drive (HDD) or a solid state drive (SSD), and stores programs to be executed by the control unit 101, data obtained during processing, and the like. In addition, the storage unit 103 is also used as a temporary storage area of programs. The display unit 104 is a liquid crystal display panel or the like, and displays various screens for a user of the computer system 100. The communication unit 105 is a communication circuit that performs communication processes, or the like. The communication unit 105 may be made up of a plurality of communication circuits compliant with a plurality of communication methods, respectively. The output unit 106 is an output interface that outputs data to an external device such as a printer or an external storage device. Note that FIG. 23 is an example, and the configuration of the computer system 100 is not limited to the example of FIG. 23.

An example of operation of the computer system 100 until the transmission data setting support program according to the first to fourth embodiments becomes in an executable state will be explained. In the computer system 100 having the above-described configuration, the transmission data setting support program is installed in the storage unit 103 from a compact disc (CD)-ROM or digital versatile disc (DVD)-ROM set in a CD-ROM drive or a DVD-ROM drive, which is not illustrated, for example. In execution of the transmission data setting support program, the transmission data setting support program read from the storage unit 103 is stored in an area that is a main storage of the storage unit 103. In this state, the control unit 101 performs transmission data setting supporting processing in the gateway devices 30, 30A, and 30B according to the first to fourth embodiments in accordance with the transmission data setting support program stored in the storage unit 103.

While the transmission data setting support program is provided with use of the CD-ROM or the DVD-ROM as a recording medium in the description above, the provision of the program is not limited thereto, and the program may be provided via a transmission medium such as the Internet via the communication unit 105, for example, depending on the configuration of the computer system 100 and the capacity of the provided program.

The data collecting unit 34, the data processing setting generating unit 38, the data transmission unit 40, and the data computing unit 45 illustrated in FIGS. 1, 11, and 17 are implemented by the control unit 101 illustrated in FIG. 23. The managed data information storage unit 33, the collected data temporary storage unit 35, the saved data storage unit 36, the transmission data extraction rule storage unit 37, the data transmission setting information storage unit 39, the computed data generation rule storage unit 43, and the data computation setting information storage unit 44 illustrated in FIGS. 1, 11, and 17 are part of the storage unit 103 illustrated in FIG. 23. The input units 31 illustrated in FIGS. 1, 11, and 17 are implemented by the input unit 102 illustrated in FIG. 23, and the display units 32 illustrated in FIGS. 1, 11, and 17 are implemented by the display unit 104 illustrated in FIG. 23.

The configurations presented in the embodiments above are examples, and can be combined with other known technologies or with each other, or can be partly omitted or modified without departing from the gist.

REFERENCE SIGNS LIST 1 data transmission system; 10 device; 20 external device; 30, 30A, 30B gateway device; 31, 102 input unit; 32, 104 display unit; 33 managed data information storage unit; 34 data collecting unit; 35 collected data temporary storage unit; 36 saved data storage unit; 37 transmission data extraction rule storage unit; 38 data processing setting generating unit; 39 data transmission setting information storage unit; 40 data transmitting unit; 41 learning device; 42 inference device; 43 computed data generation rule storage unit; 44 data computation setting information storage unit; 45 data computing unit; 60 network; 100 computer system; 101 control unit; 103 storage unit; 105 communication unit; 106 output unit; 107 system bus; 330 managed data information; 335 cross-reference information; 370 transmission data extraction rule; 390 data transmission setting information; 411, 421 data obtaining unit; 412 model generating unit; 413 learned model storage unit; 422 inference unit; 430 computed data generation rule; 440 data computation setting information.

The invention claimed is:

1. A non-transitory storage medium to store a transmission data setting support program to cause a computer to execute:
   a first rule reading process of reading a transmission data extraction rule, the transmission data extraction rule being a rule defining a condition for extracting transmission data from collected data, using attribute information indicating characteristics of the data, the transmission data being data to be transmitted to an external device, the collected data being data collected from devices;
   a transmission data extracting process of extracting data satisfying the transmission data extraction rule, from data collection setting information including setting of the computer when collecting the collected data from the devices;
   a data adding process of adding the extracted data to data transmission setting information including a condition for transmission of the transmission data to the external device, and leaving transmission-cycle and transmission-destination fields blank in the data transmission setting information; and
   a user input process of allowing a user to input a transmission cycle and a transmission destination, of the transmission data into the blank transmission-cycle field and the blank transmission-destination field, respectively.

2. The storage medium according to claim 1, wherein the attribute information is information that is at least one of a data name and a data type of the data, a connected device indicating the device using the data, an address indicating a position at which the data is stored, and a comment added to the data, all of which are in the data collection setting information.

3. The storage medium according to claim 1, wherein
   the attribute information includes, in addition to information in the data collection setting information, information in cross-reference information including relation between the data and a program using the data and executed in the device, and
   in the transmission data extracting process, the data included in both the cross-reference information and the data collection setting information is extracted as the transmission data.

4. The storage medium according to claim 1, wherein the attribute information is information that is at least one of a collection cycle of the data and a retention period of the data.

5. The storage medium according to claim 1, wherein the program further causes the computer to execute:
   a first obtaining process of obtaining learning data including the data collection setting information and the data transmission setting information; and
   a model generating process of, using the learning data, generating a learned model for inferring, from the data collection setting information, a candidate for the transmission data to be added to the data transmission setting information.

6. The storage medium according to claim 1, wherein the program further causes the computer to execute:
   a second obtaining process of obtaining the data collection setting information; and
   an inferring process of outputting a candidate for the transmission data from the data collection setting information input in the second obtaining process, using a learned model for inferring, from the data collection setting information, a candidate for the transmission data to be added to the data transmission setting information.

7. The storage medium according to claim 1, wherein the program further causes the computer to execute:
   a second rule reading process of reading a computed data generation rule defining a content of computation computed data being data computed using at least one of the collected data and data managed by the computer when the computed data are to be transmitted to the external device;
   an arithmetic expression generating process of adding, to data computation setting information, a record including an arithmetic expression and a data name assigned to the arithmetic expression, the data computation setting information defining a relation between the arithmetic expression and the data name, the arithmetic expression being generated in accordance with the computed data generation rule, using data in managed data information including setting of the computer for the computer to collect and manage data; and
   a data adding process of adding, to the data transmission setting information, a record including the data name added in the arithmetic expression generating process; and a displaying process of displaying, on the display unit, the data transmission setting information including the added data.

8. A gateway device to transmit, to an external device, data in accordance with a setting among collected data, the collected data being data collected from devices, the gateway device comprising:

a memory to:

store a transmission data extraction rule being a rule defining a condition for extracting transmission data from the collected data, using attribute information indicating characteristics of the data, the transmission data being data to be transmitted to an external device;

store data collection setting information including setting for collecting the collected data from the devices; and a controller to extract data satisfying the transmission data extraction rule from the data collection setting information, add the extracted data to data transmission setting information including a condition for transmission of the transmission data to the external device, leave transmission-cycle and transmission-destination fields blank in the data transmission setting information, and allow a user to input a transmission cycle and a transmission destination, of the transmission data into the blank transmission-cycle field and the blank transmission-destination field, respectively.

9. A transmission data setting supporting method to be performed by a gateway device, the transmission data setting supporting method comprising:

reading a transmission data extraction rule, the transmission data extraction rule being a rule defining a condition for extracting transmission data from collected data, using attribute information indicating characteristics of the data, the transmission data being data to be transmitted to an external device, the collected data being data collected from devices;

extracting data satisfying the transmission data extraction rule, from data collection setting information including setting the gateway device when collecting the collected data from the devices;

adding the extracted data to data transmission setting information including a condition for transmission of the transmission data to the external device;

leaving transmission-cycle and transmission-destination fields blank in the data transmission setting information; and allowing a user to input a transmission cycle and a transmission destination, of the transmission data into the blank transmission-cycle field and the blank transmission-destination field, respectively.

10. A storage medium according to claim 1, wherein the program further causes the computer to display the data transmission setting information including the added data.

* * * * *